(12) United States Patent
Taylor et al.

(10) Patent No.: US 7,907,690 B2
(45) Date of Patent: Mar. 15, 2011

(54) INTERFERENCE CANCELLATION SYSTEM AND METHOD USING IMPULSE RESPONSE

(75) Inventors: Doug Taylor, Kanata (CA); John Fanson, Ottawa (CA); George Price, White City (CA); Tooraj Esmailian, Folsom, CA (US); Laszlo Hazy, Ottawa (CA)

(73) Assignee: Edgewater Computer Systems, Inc. (CA)

( * ) Notice: Subject to any disclaimer, the term of this patent is extended or adjusted under 35 U.S.C. 154(b) by 1093 days.

(21) Appl. No.: 11/550,283

(22) Filed: Oct. 17, 2006

(65) Prior Publication Data
US 2008/0089451 A1 Apr. 17, 2008

(51) Int. Cl.
  *H04B 1/10* (2006.01)
(52) U.S. Cl. ........ 375/350; 375/346; 375/285; 455/307; 708/300
(58) Field of Classification Search .......... 375/350, 375/346, 285; 455/307; 708/300
See application file for complete search history.

(56) References Cited

U.S. PATENT DOCUMENTS

| | | | |
|---|---|---|---|
| 4,251,886 A * | 2/1981 | Roza | 375/290 |
| 5,117,377 A | 5/1992 | Finman | 364/578 |
| 5,453,737 A | 9/1995 | Opeczynski | 340/2.8 |
| 5,742,591 A | 4/1998 | Himayat et al. | 370/286 |
| 6,188,718 B1 | 2/2001 | Gitlin et al. | 375/148 |
| 6,741,185 B2 | 5/2004 | Shi et al. | 340/853.2 |
| 6,741,711 B1 * | 5/2004 | Sibbald | 381/310 |
| 6,754,293 B1 | 6/2004 | Henriksson et al. | 375/346 |
| 6,813,352 B1 * | 11/2004 | Duttweiler | 379/406.08 |
| 6,823,100 B1 | 11/2004 | Roemerman | 385/18 |
| 6,847,702 B1 | 1/2005 | Czerwiec et al. | 379/29.01 |
| 7,092,452 B2 | 8/2006 | Taylor et al. | 375/267 |
| 7,254,158 B2 | 8/2007 | Agrawal | 375/136 |
| 7,356,389 B2 | 4/2008 | Holst et al. | 701/3 |
| 7,483,450 B1 | 1/2009 | Giese et al. | 370/507 |
| 2003/0018840 A1 | 1/2003 | Chandler et al. | 710/100 |
| 2003/0081763 A1 * | 5/2003 | Tang et al. | 379/406.01 |
| 2003/0123584 A1 * | 7/2003 | Siegel et al. | 375/350 |
| 2003/0169832 A1 * | 9/2003 | Schmidt et al. | 375/340 |
| 2003/0189999 A1 | 10/2003 | Kadous | 375/349 |
| 2003/0223354 A1 | 12/2003 | Olszewski | 370/208 |
| 2004/0013131 A1 | 1/2004 | Owens et al. | 370/466 |
| 2004/0205285 A1 | 10/2004 | Kinstler | 710/315 |
| 2004/0208266 A1 * | 10/2004 | Lenosky | 375/346 |

(Continued)

OTHER PUBLICATIONS

Komodromos, "Design of FIR Filters with Complex Desired Frequency Response Using a Generalized Remez Algorithm," IEEE transactions on circuits and systems-11: analog and digital signal processing, vol. 42, No. 4, Apr. 1995 pp. 274-278.*

(Continued)

*Primary Examiner* — Juan A Torres
(74) *Attorney, Agent, or Firm* — Hayes Soloway P.C.

(57) ABSTRACT

An interference cancellation (IC) system and method for use within a 1553 communication system comprising a data bus carrying primary signals having a 1553 component and a non-1553 component are provided. The IC system has an input port, a 1553 data extraction block and an interference cancellation circuit with an interference measurement and a cancellation block. The interference measurement block receives 1553 decoded data from the 1553 data extraction block and a sampled primary signal via the input port, and, within an impulse response block, produces an interference signal based on a 1553 impulse response system model. The cancellation block subtracts the interference signal from the sampled primary signal and produces an output signal with the 1553 component substantially cancelled. Furthermore, an IC system using adaptive filtering techniques within the impulse response block is provided. The Least Mean Squares (LMS) algorithm can be used as an adaptive filter technique.

17 Claims, 20 Drawing Sheets

U.S. PATENT DOCUMENTS

| | | | | |
|---|---|---|---|---|
| 2004/0229615 | A1* | 11/2004 | Agrawal | 455/436 |
| 2005/0281364 | A1* | 12/2005 | Pavan | 375/350 |
| 2006/0101184 | A1 | 5/2006 | Hegarty | 710/307 |
| 2007/0291881 | A1 | 12/2007 | Glass | 375/346 |
| 2008/0059202 | A1* | 3/2008 | You | 704/500 |

OTHER PUBLICATIONS

Khosravi, "Implementation of linear digital filters bases on morphological representation theory", IEEE transactions on signal processing vol. 42 No. 9 Sep. 1994 pp. 2264-2275.*

Ying, "Identification of Stable Linear Systems Using Polynomial Kernels", Ind. Eng. Chem. Res., 1999, 38 (12), pp. 4712-4728, Publication Date (Web): Nov. 16, 1999 American Chemical Society.*

Zoltowski, "On the use of basis functions in blind equalization based on deterministic least squares," Conference Record of the Thirty-First Asilomar Conference on Signals, Systems & Computers, 1997, vol. 1 Publication Year: 1997, pp. 816-822 vol. 1.*

Akçay, "Rational basis functions for robust identification from frequency and time domain measurements," Proceedings of the 1998 American Control Conference, 1998, vol. 6 Publication Year: 1998, pp. 3559-3563 vol. 6.*

Official Actions in related U.S. Appl. Nos. 11/463,860, 11/419,742 and 11/614,875.

Graber, Bryan, The Use of Discrete Multi-Tone (DMT) Signaling for Data Transmissions on Esistin AS15531 Networks; White Paper on DMT Technology, Aug. 15, 1998.

Adams Charlotte, "Product Focus: 1553, Still a Key Standard", Aviation Today, Dec. 1, 2000. www.aviationtoday.com/cgi/av/show_mag.cgi?pub=av&mon=1200&file=1200productfocus.htm.

Keller, John, "Rebirth of the 1553 databus", Military & Aerospace Electronics, Feb. 2006. http://mae.pennnet.com/Articles_Display.cfm?Section=ARTCL&ARTICLE_ID=248183&VERSION_NUM=2&p=32.

Graber, Bryan, "The Use of Discrete Multi-Tone (DMT) Signaling for Data Transmissions on Existing AS15531 Networks," White Paper on DMT Technology, Aug. 15, 2006.

USPTO Office Action dated Apr. 30, 2010, U.S. Appl. No. 11/419,742.

* cited by examiner

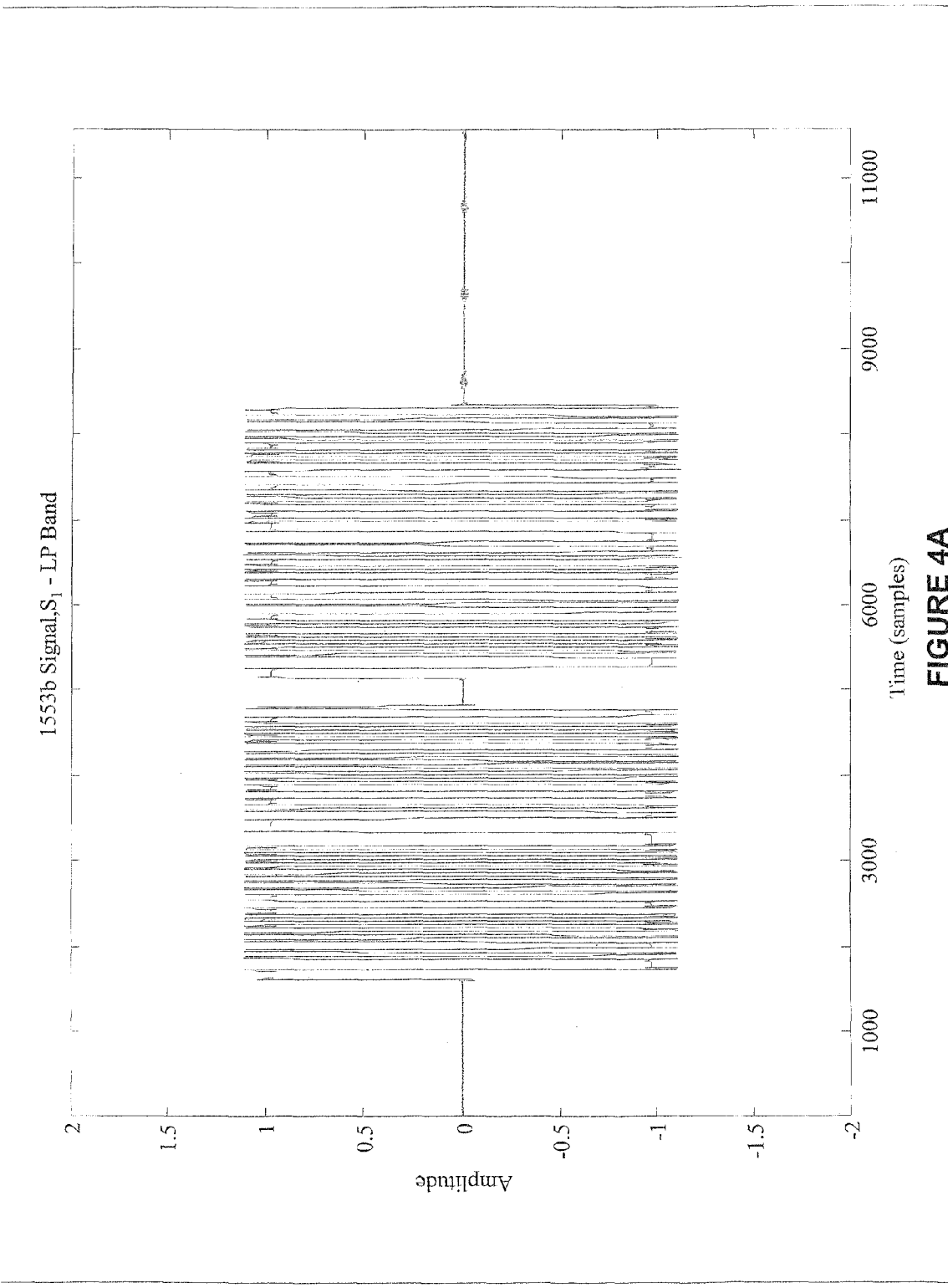

INTERFERENCE CANCELLATION SYSTEM AND METHOD USING IMPULSE RESPONSE

STATEMENT REGARDING FEDERALLY SPONSORED RESEARCH OR DEVELOPMENT

This invention was made with Government support under Contract FA8626-06-D-2083 awarded by the United States Air Force. The Government has certain rights in the invention.

CROSS-REFERENCE TO RELATED APPLICATIONS

This application is related to co-assigned U.S. patent application Ser. No. 11/419,742, entitled "Data Communications System and Method", filed on May 22, 2006, and to co-assigned U.S. patent application Ser. No. 11/463,860 entitled "Interference Cancellation System and Method", filed on Aug. 10, 2006, both of which are incorporated here by reference.

BACKGROUND OF THE INVENTION

The AS15531 databus, also known as MIL-STD-1553 or simply 1553, is an approximately 30 year old technology that defines the electrical and signaling characteristics for 1 Mbps communications over an asynchronous serial, command/response digital data bus on which messages are time division multiplexed among users. 1553 specifies all of the electrical characteristics of the receivers, transmitters, and cable used to implement the bus, as well as the complete message transmission protocol.

The United States Department of Defense ("DoD") requires the use of 1553 as the standard for all inter and intra-subsystem communications on all military airplanes, helicopters, ships and land vehicles. Originally used only in mission avionics, 1553 is now used in flight critical avionics, flight control, weapons, electrical power control, and propulsion control. 1553 was originally published in 1973 for use on the F-16 military aircraft program. The most commonly used version of 1553 is MIL-STD-1553B ("1553b"), initially implemented in 1986. MIL-STD-1553B utilizes a primitive Manchester II bi-phase signaling scheme over shielded twisted pair cabling. This modulation scheme is bandwidth inefficient as most of the signal energy is concentrated around 1 MHz. MIL-STD-1553b leaves little opportunity for enhancing existing applications and for enabling additional communication capabilities.

On the other hand, state-of-the-art equipment devices, such as Line Replaceable Units (LRUs) or munitions, which are retrofitted to an airframe, often require high bandwidth data links between the new equipment to points in the airframe where control or monitoring is performed. The retrofitting of an aircraft to add new equipment by rewiring is a very complex process, which requires many months of modification time and involve substantial expenses. Also, rewiring usually adds weight to the aircraft and takes up space.

The use of various technologies to increase the data transfer capacity of existing AS15531 networks without rewiring has been investigated by the Society of Automotive Engineers (SAE) Avionics Systems Subcommittee (AS-1A), in cooperation with SBS Technologies Inc. Results of their investigation are described in a white paper entitled "The Use of Discrete Multi-Tone (DMT) Signaling for Data Transmissions on Existing AS15531 Networks", published on 15 Aug. 1998, which is incorporated herein by reference. The paper indicates that, Digital Subscriber Line (DSL) coding techniques, such as Carrier-less Amplitude/Phase (CAP) coding and Orthogonal Frequency Division Multiplexing (OFDM), closely related to Discrete Multi-Tone (DMT) coding present themselves as particularly suitable examples of overlay technologies. This paper, however, fails to indicate the feasibility of an operable system that would allow existent 1553 networks to operate in their multi-drop, dual-redundant architecture, at a data transfer rate above 1 Mbps and signaling frequencies above approximately 10 MHz.

According to the preferred embodiment disclosed in the co-assigned U.S. application Ser. No. 11/419,742, OFDM modulation is used to better utilize the available bandwidth on the bus, creating an "overlay" network to operate concurrently and without disturbing existing 1553 communications. As illustrated in FIG. 1, this is accomplished by configuring OFDM signals with little energy, or low Power Spectral Density (PSD), in a 1553 high-energy frequency band (0 to $F_{1553}$) and with a relatively constant Power Spectral Density (PSD) in a 1553 low-energy frequency band ($F_{1553}$ to $F_{OFDM}$). In other words, the OFDM waveforms are configured to utilize the frequency band from $F_{1553}$ to $F_{OFDM}$, where 1553 side lobes of a given 1553 system are relatively low. The OFDM signals have little energy in the 0 to $F_{1553}$ band, reducing the interference of OFDM communications on existing 1553 communications. However, within a system comprising signaling as illustrated in FIG. 1, 1553 sidelobes in the OFDM frequency band have sufficient energy to interfere with the OFDM signals thus limiting the data throughput of the OFDM overlay networks and therefore of the entire communication system.

To summarize, within a non-1553 data communications overlay network, non-1553 signals are susceptible to interference from the 1553 signals being communicated over the same physical medium.

1553 signals are defined as signals in accordance with 1553 standard signaling schemes, including but not limited to primitive Manchester II bi-phase signaling. Non-1553 signals are defined as any signals that can be differentiated from 1553 signals either in frequency domain, time domain, Laplace domain, or by any other method obvious in the art.

There is a need in the art for efficient methods of attenuating the interference of 1553 signals on non-1553 signals within a non-1553 network overlayed without rewiring on a 1553 communication system, for increasing throughput of the overall communication system.

SUMMARY OF THE INVENTION

An object of the invention is to provide a 1553 interference cancellation system and method for non-1553 data communications over a 1553 data communication system.

An interference cancellation (IC) system for use within a 1553 communication system comprising a data bus carrying primary signals having a 1553 component and a non-1553 component is provided. The IC system has an input port, a 1553 data extraction block and an interference cancellation circuit. The input port receives a sampled primary signal from the data bus, via an analog-front end block having sampling means. The 1553 data extraction block extracts 1553 data from the sampled primary signal and produces 1553 decoded data. The interference cancellation circuit has an interference measurement and a cancellation block. The interference measurement block receives the 1553 decoded data and the sampled primary signal, and within an impulse response block, produces an interference signal based on a 1553 impulse response system mode. The cancellation block subtracts the interference signal from the sampled primary signal and produces an output signal with the 1553 component substantially cancelled.

Furthermore, an IC system using adaptive filtering techniques within the impulse response block is provided. According to an embodiment of the invention, the Least Mean Squares (LMS) algorithm is used as an adaptive filter technique.

Even further, an IC system obtaining impulse response coefficients based on accumulated basis functions is provided.

An impulse response system and method based on accumulated basis functions are also provided. The impulse response system has an accumulated basis function block and an impulse response block using impulse response coefficients based on the accumulated basis functions.

Furthermore, a method of canceling 1553 interference on non-1553 communication within a 1553 communication system is provided. The method comprises an initial step of acquiring from a data bus a sampled primary signal, where the sampled primary signal comprises non-1553 encoded data and 1553 encoded data. Next, 1553 encoded data within the sampled primary signal is decoded to produce a decoded 1553 data. Afterwards, a variant of an interfering signal is produced based on the decoded 1553 data and based on the sampled primary signal using an impulse response modeling technique. Finally, the variant of the interfering signal is subtracted from the sampled primary signal to produce an output signal with a substantially canceled 1553 component.

Advantageously, the system and method according to invention allow for increased data throughput through a 1553 communication system with a non-1553 system overlay.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, where:

FIGS. 4A, 4B, 4C and 4D are waveform representations of signals within the system of FIG. 3;

FIG. 12A illustrates a reference signal constructed based on special impulse sequences in FIG. 11;

FIG. 13A illustrates a reference signal constructed based on special impulse sequences in FIG. 8;

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 2:
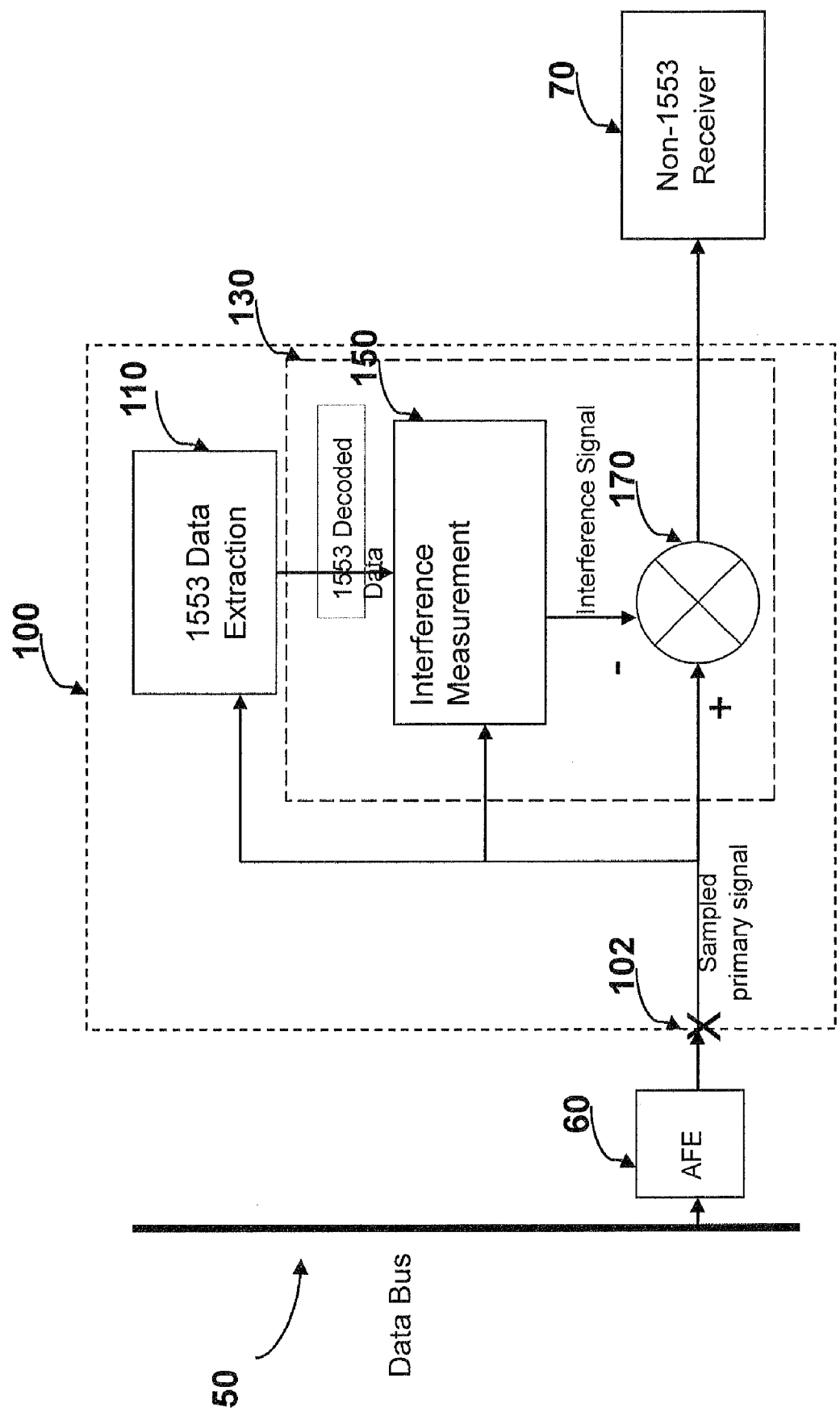
FIG. 2 is a block diagram of an interference cancellation system according to the invention.

FIG. 2 illustrates an interference cancellation system 100 according to the invention. The interference cancellation system 100 is part of a 1553 communication system having an overlay non-1553 communication system. Primary analog signals having a 1553 component and a non-1553 component are being sent and received between various terminals over a data bus 50. According to the present invention, the interference cancellation system 100 is used in canceling interference of 1553 signals on non-1553 signals, in other words in reducing the 1553 component within the primary signal, prior to decoding for the non-1553 component at a non-1553 receiver 70.

The interference cancellation system 100 can be viewed as having an input port 102, a 1553 data extraction block 110, an interference measurement block 150 and a cancellation block 170. The interference measurement block 150 and the cancellation block 170 are also referred collectively, in the present description, as an interference canceller 130, or interference cancellation circuit.

The interference cancellation system 100 receives through the input port 102 a sampled primary analog signal from the data bus 50, where the sampling of the primary analog signal is performed by an analog front-end block (AFE) 60, comprising necessary sampling components, such as one or more analog-to-digital converters (A/D) of a suitable resolution. For enhanced performance, the AFE might also comprise other components such as filters, an automatic gain control (AGC), etc.

The 1553 data extraction block 110 is extracting 1553 data from the sampled primary analog signal received from the input port 102 and outputs 1553 decoded data. The interference measurement block 150 receives the 1553 decoded data and the sampled primary analog signal and produces an interference signal, also referred to as a 1553 interference signal. The cancellation block 170 subtracts the interference signal from the sampled primary analog signal, producing a non- 1553 signal with reduced 1553 signaling interference, which is further transmitted to the non-1553 receiver 70.

An interference cancellation system based on a direct basis function technique is described in the co-pending and co-assigned United States application entitled "Interference Cancellation System and Method". The technique comprises the step of compiling a catalog of 1553 signal segments or basis functions, which can be concatenated to synthesize any possible 1553 signal. This catalog is compiled within an interference measurement block by averaging many observed primary signal segments to reduce components that appear as uncorrelated with the 1553 signaling scheme. A 1553 interference signal is synthesized simply by concatenating together catalogued 1553 basis functions in an order directed by 1553 decoded data.

The present invention presents alternate implementations of the interference measurement block 150, presenting further advantages such as speed and storage requirements in most cases, degree of interference cancellation achieved for substantially linear systems, ease of implementation etc. The alternate implementations rely on the interference measurement block 150 using an impulse response (IR) approach, by modeling the path traveled by the 1553 signal within the primary signal, starting from the originating 1553 transmitter (not shown) and up to the 1553 data extraction block 110, as a linear system. Specifically, the IR model is used to synthesize a replica of the 1553 interfering signal, as the response of the model linear system when excited by a train of impulses x(n). The synthesized 1553 interference signal 1553 IS is given by $$y(n) = w^T x(n) \quad (1)$$

where $w^T$ is the transposed column vector w of N impulse response coefficients and x(n) is the column vector given by the N most recent input samples:

$$x(n) = [x(n)x(n-1) \ldots x(n-N+1)]^T \quad (2)$$

The problem of determining the impulse response coefficient vector w which will best replicate the 1553 transmitter, channel and interference cancellation system front end can be approached in several ways. Two preferred implementations will be described. Briefly, one approach uses an adaptive filtering technique based on the least mean squares (LMS) algorithm. Other adaptive filtering techniques that would also be suitable, are the Recursive Least Squares (RLS), and frequency domain techniques, such as the Overlap and Save Frequency Domain Adaptive Filtering (OSFDAF). The other approach for determining the IR coefficient vector w is to accumulate a small number of basis functions and solve for w directly from these.

Figure 1:
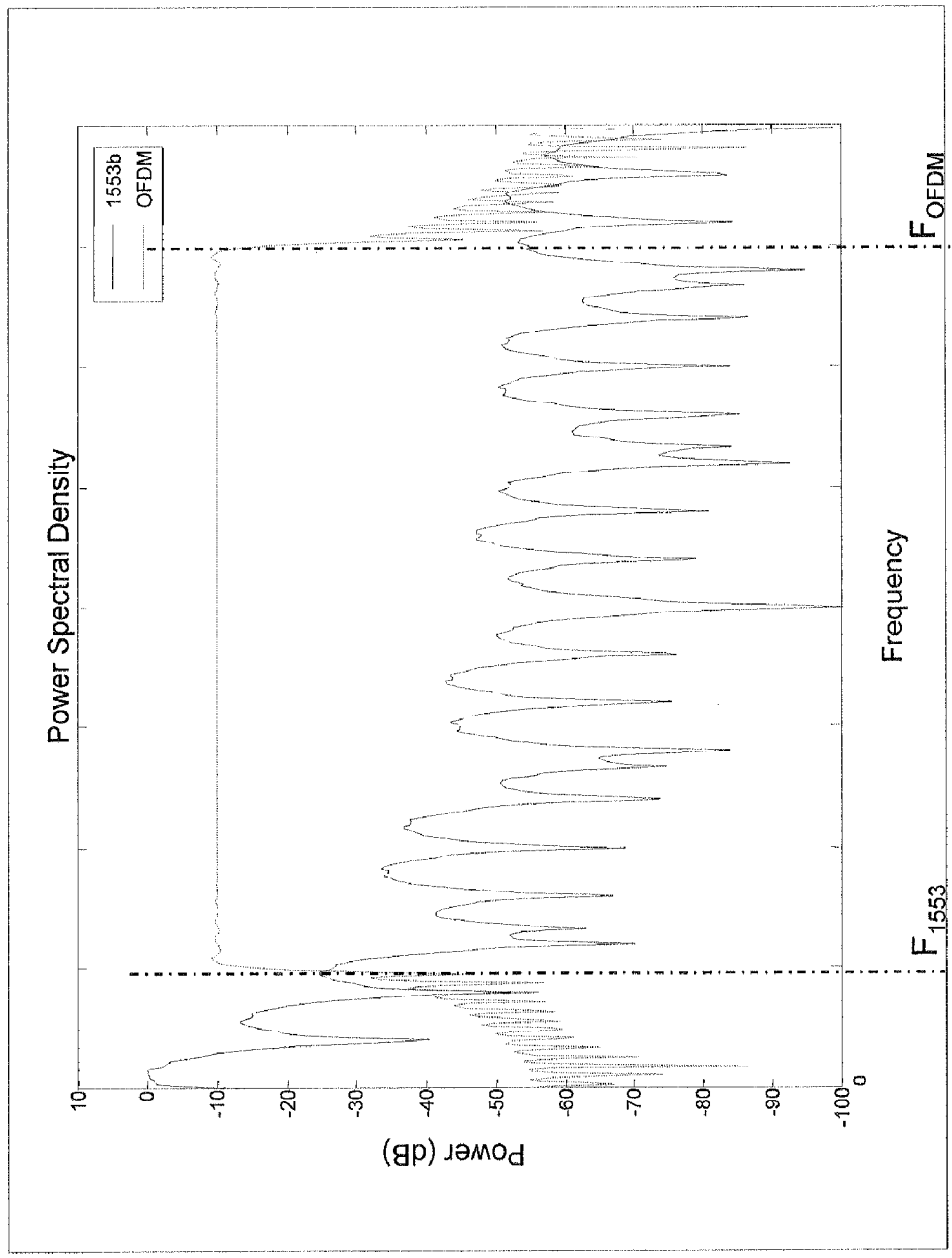
FIG. 1 illustrates a theoretical Power Spectral Density (PSD) plot of a primary signal comprising an OFDM component and a 1553 component within a 1553 communication system.
Figure 3:
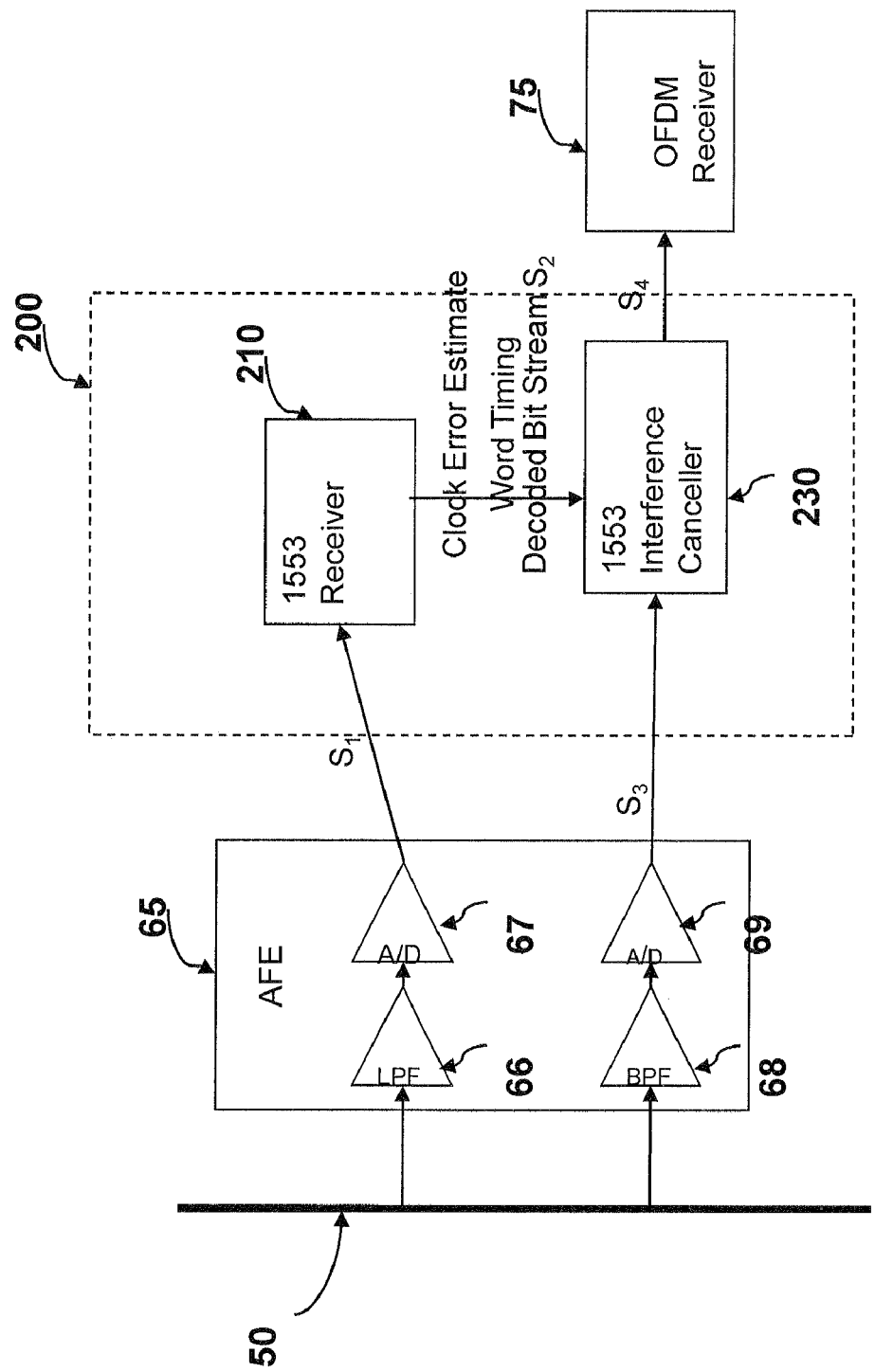
FIG. 3 is a block diagram of an interference cancellation system according to the preferred embodiment of the invention.

1553 Interference Cancellation for OFDM Signals—Sampling the Primary Signals and Extracting 1553 Data A top level architecture of an interference cancellation system 200 according to a preferred embodiment of the invention is illustrated in FIG. 3. In the preferred embodiment, non-1553 signaling is achieved via OFDM coding, so the primary signals carried by the data bus 50 comprise a 1553 component, also referred herein as 1553 signals or 1553 waveforms, and an OFDM component, also referred herein as OFDM signals or OFDM waveforms. Primary signals have a frequency band assignment as illustrated in FIG. 1, with 1553 waveforms having most of their energy in the 0 to $F_{1553}$ frequency band and with the OFDM waveforms utilizing mainly the $F_{1553}$ to $F_{OFDM}$ frequency band.

Figure 4B:
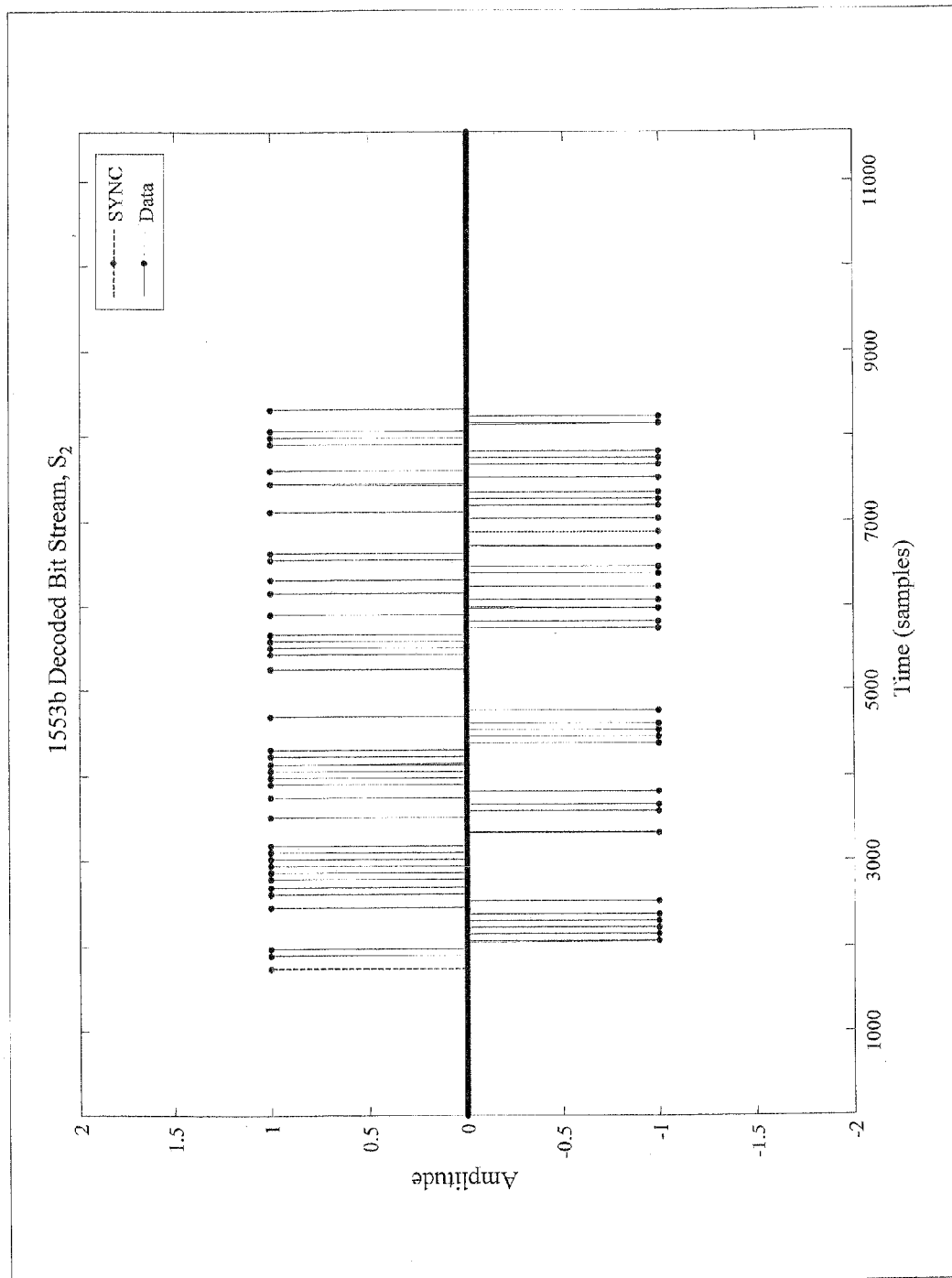
Figure 4C:
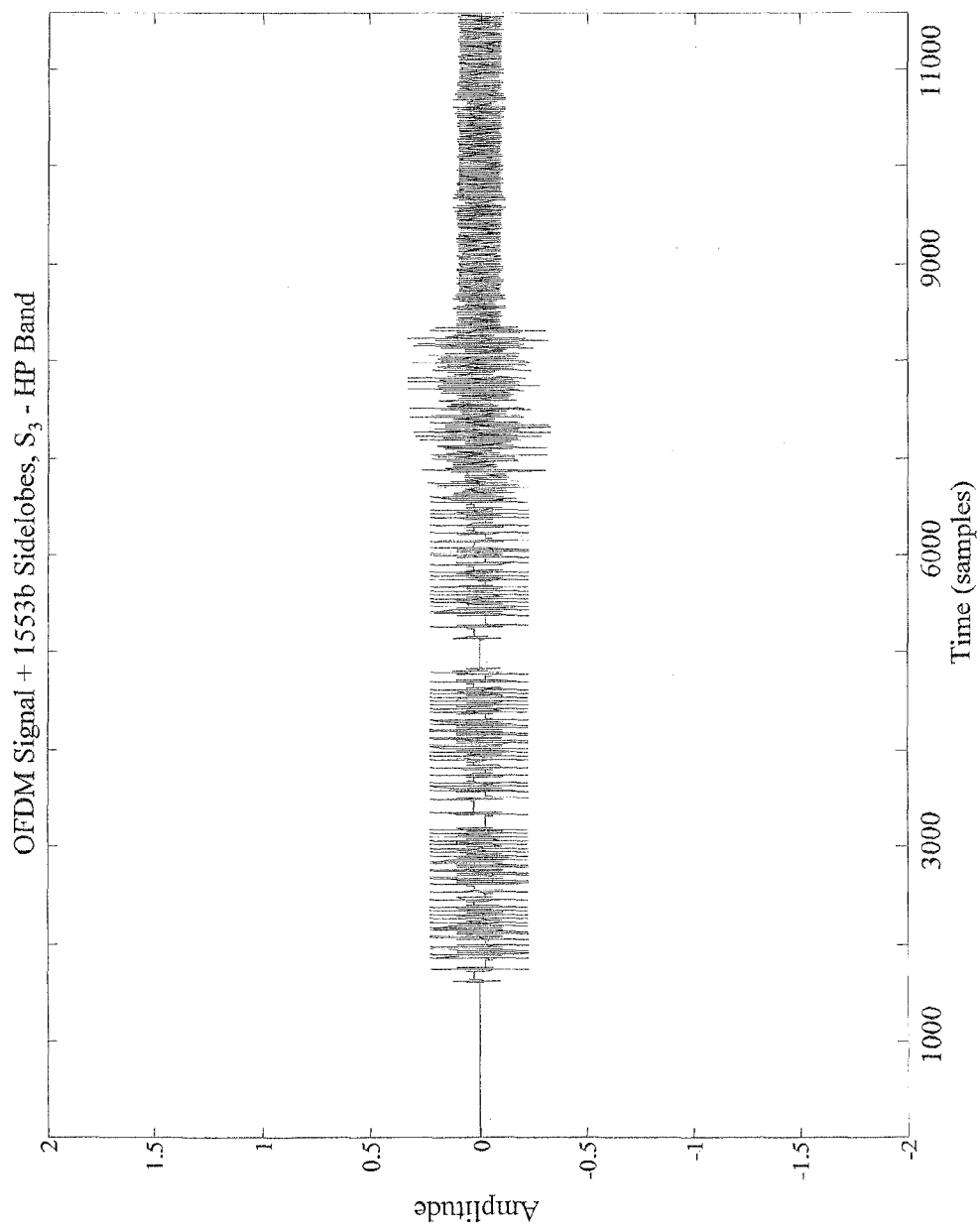

AFE 65 is connected to bus 50 to receive a primary signal and processes the primary signals into a first and a second sampled primary signals, $S_1$ and $S_3$, shown on FIGS. 4A and 4C, respectively. In producing the first and second sampled primary signals, $S_1$ and $S_3$, signal dynamic range and limited number of bits in an analog to digital converter are preferably considered. For such considerations, the AFE 65 utilizes a low pass filter (LPF) 66 to isolate $S_1$ within the 1553 frequency band of interest, 0 to $F_{1553}$, and a bandpass filter (BPF) 68 to isolate $S_3$ within the OFDM frequency band of interest, $F_{1553}$ to $F_{OFDM}$. The filters are followed by analog to digital converters (A/D), 67, 69, for each frequency band. The sampling rates and number of bits in the A/D converters 67, 69, are selected appropriately to satisfy Nyquist criteria and resolution requirements. Due to dynamic range considerations at the OFDM receiver, an AGC could be advantageously used to adjust the gain of the signal going into the A/D 69.

Furthermore, traditional AFE within 1553 transceivers are typically 1 bit A/D converters that accept a bi-phase differential signal at the input and compare these levels to a threshold to convert it to a binary output. For the preferred embodiment, in order to achieve a timing accuracy suitable for efficient 1553 interference cancellation, A/D converter 67 has higher resolution and higher frequency than traditional A/D converters, such as 8 bits at 80 MHz for $F_{RX-OFDM} = 80$ MHz.

A 1553 receiver 210 is used for 1553 data extraction from the first sampled primary signal, $S_1$. The 1553 receiver 210 receives the first sampled primary analog signal $S_1$ from AFE 65 and produces metrics for the Interference Canceller 230. A preferred set of 1553 metrics include a decoded 1553 bit stream $S_2$, as illustrated in FIG. 4B, a 1553 word timing and an estimate of the clock error of the 1553 transmitter relative to the OFDM receiver.

The 1553 word timing must have an accuracy of a fraction of the OFDM receiver sample period, $1/F_{RX-OFDM}$. The IC system will be operating at substantially the same clock frequency as the OFDM system and will expect this clock frequency to be an integer multiple of the 1553 symbol frequency. Typically, crystal oscillators are used to clock state-of-the-art circuits and can have an accuracy of less than ±20 parts per million (p.p.m.). Older 1553 devices may have clock frequencies that deviate more than this due to the technology available at the time and the affect of aging on these types of components. Consequently, any given 1553 device will not usually operate with the symbol frequency expected by the IC system and the offset between this expected frequency and the actual 1553 frequency is referred to as the clock error.

Figure 4D:
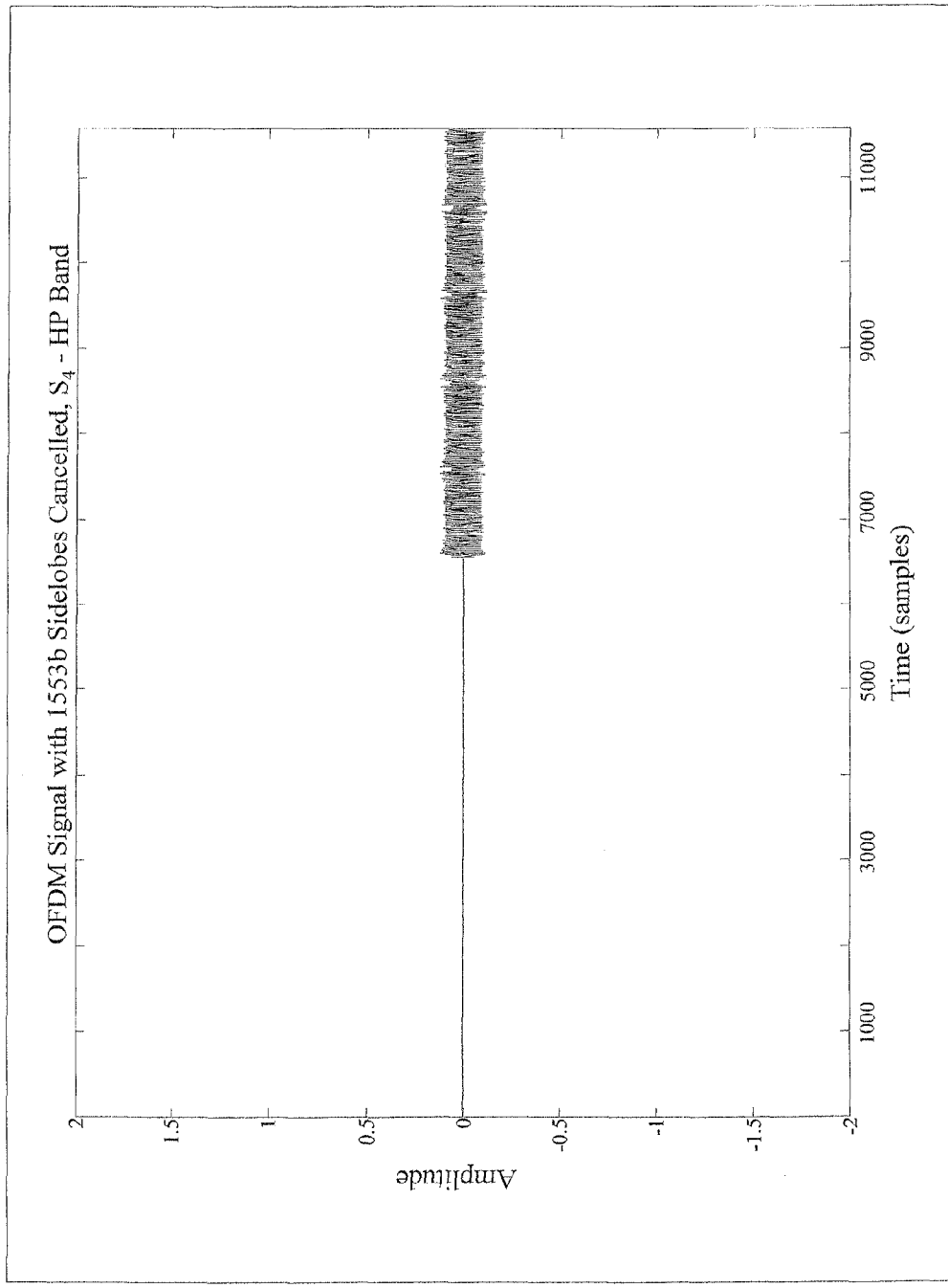

In addition to 1553 metrics, an Interference Cancellation circuit 230 also receives the second sampled primary analog signal $S_3$ from the AFE 65. The Interference Cancellation circuit 230 uses the metrics from the 1553 receiver 210 to synthesize the unwanted, interfering 1553 signaling component (or, simply, 1553 interference signal) and subtract from the received second sampled primary sampled signal $S_3$. The residual signal $S_4$ at the output of the interference cancellation circuit 230 is further passed to an OFDM receiver for demodulation. The $S_4$ waveform is shown in FIG. 4D.

Figure 5:
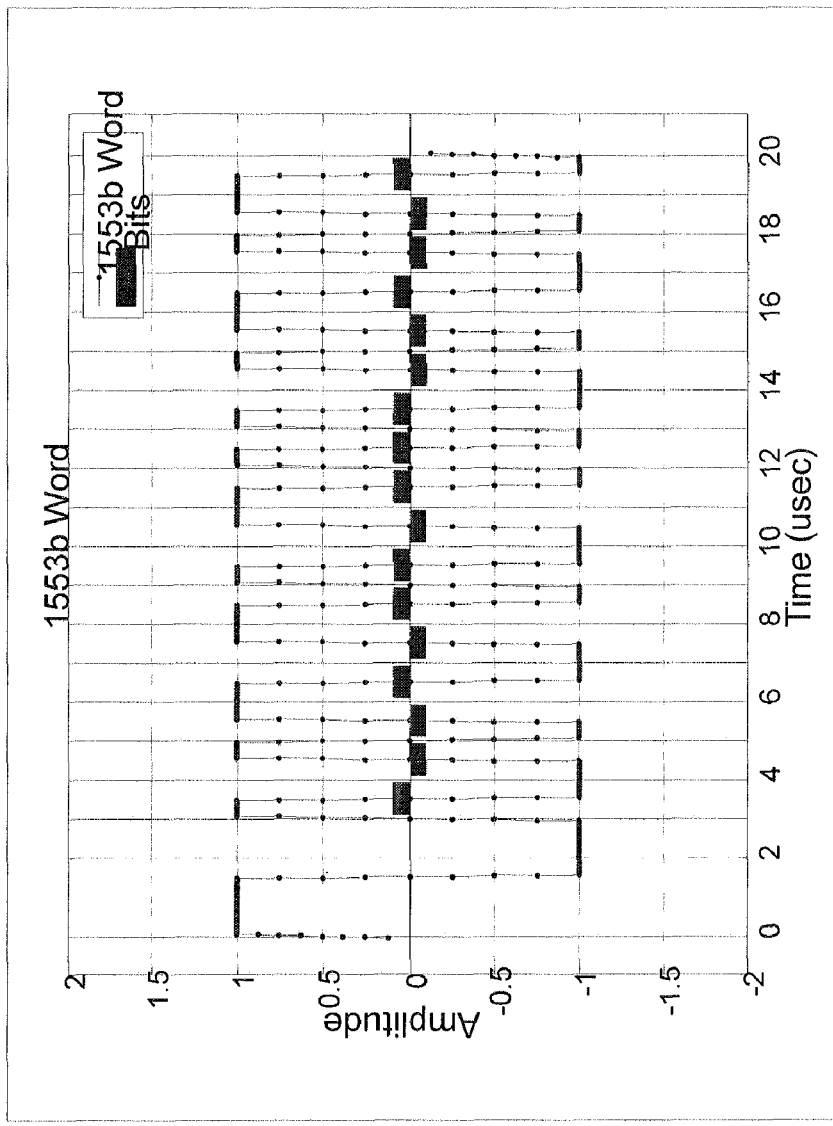
FIG. 5 is waveform representation of a typical 1553 word according to the 1553b standard.
Figure 6:
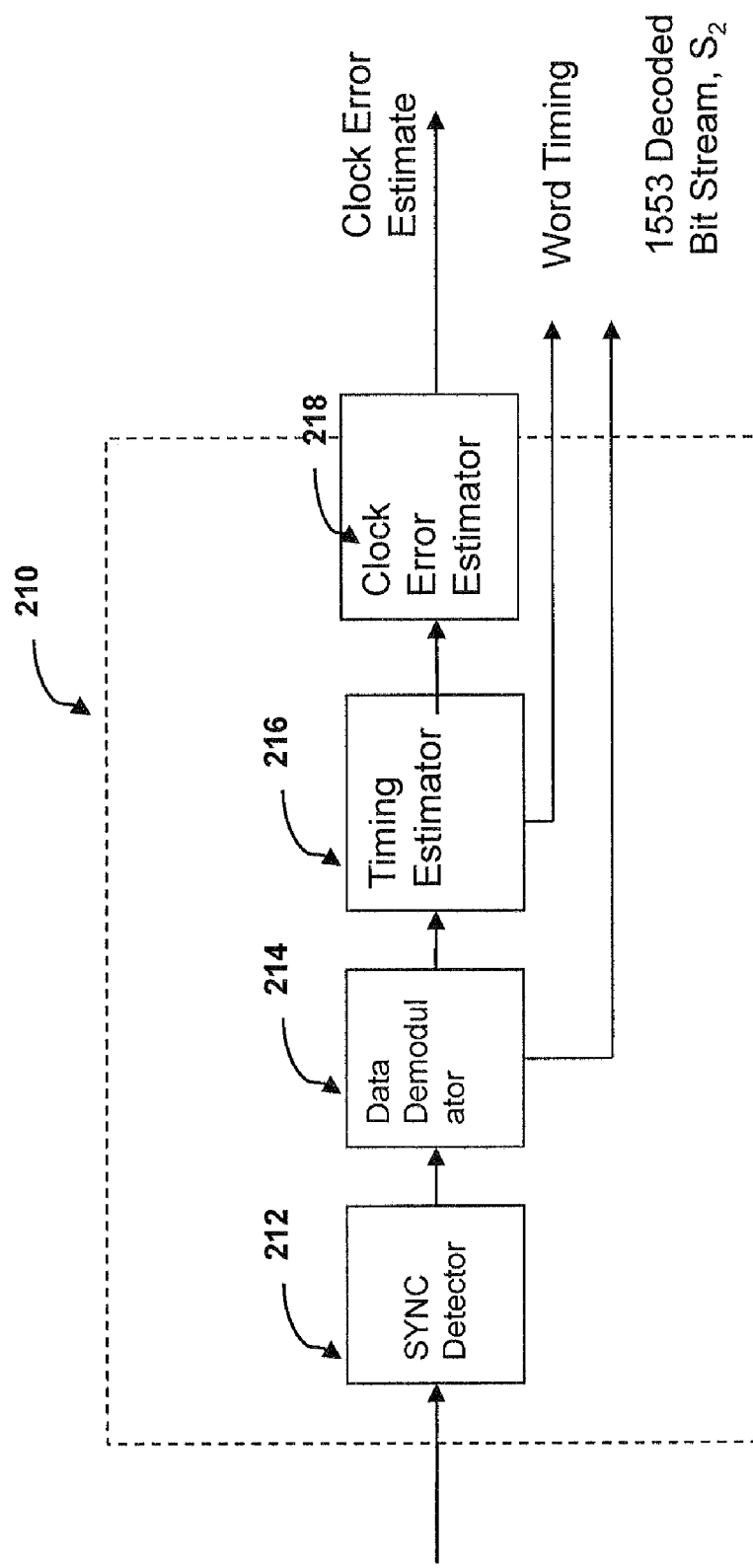
FIG. 6 is a block diagram of a 1553 receiver within the interference cancellation system in FIG. 3.

The operation of the 1553 receiver 210 in extracting 1553 decoded data according to the preferred embodiment is further detailed, in reference to FIGS. 5 and 6. FIG. 5 shows a transmitted 1553 signal according to MIL-STD-1553B, consisting of waveforms representing a 1553b word comprising a synchronization (SYNC) symbol (3 bit times), followed by 16 data symbols and 1 parity symbol. Multiple 1553b words can be concatenated to create a longer 1553b message. The bit rate is 1 bit/symbol and the symbol rate is 1 symbol/μsec. Bit values for the data symbols and parity symbol (positive indicating a value of 1 and negative indicating a value of 0) are indicated by thick bars along the time axis. As shown in FIG.

6, for producing a 1553 decoded bit stream, a 1553 symbol/word timing estimate and a 1553 clock error estimate, the 1553 receiver 210 comprises a SYNC detector 212, a data demodulator 214, a Symbol/Word Timing estimator 216 and a Clock Error Estimator 218.

The SYNC detector 212 searches for valid SYNC symbol in $S_1$. After a valid SYNC detected, the data demodulator 214 decodes a 16 bit message and parity bit from the following 17 symbols within $S_1$. A bit is determined to be a 1 or a zero by measuring a transition from a positive to negative voltage or negative to positive voltage respectively at the appropriate times after the middle zero crossing of the SYNC symbol. SYNC symbols can either transition from a positive to negative voltage or vice-versa depending on the type of word being transmitted. The SYNC zero crossing occurs at approximately 1.5 μsec, from the beginning of the word. The transition of the first data symbol occurs approximately 2 μsec after the SYNC zero crossing and subsequently about every 1 μsec.

The Timing Estimator block 216 computes the accurate 1553 symbol/word timing. The timing of the 1553 word can be determined by averaging the zero crossing timing of the SYNC symbol, data symbols and parity symbol. According to MIL-STD-1553, there is significant tolerance in determining the timing of the zero crossings (zero crossing jitter) that amounts to 150 nsec or 15% of the bit time. Although this is suitable for 1553 demodulation, 1553 interference cancellation is preferably achieved by determining the timing of a 1553 symbol or word to a fraction of a sample at the sampling rate of the OFDM receiver $F_{RX-OFDM}$ (preferably <10 nsec for $F_{RX-OFDM}$=80 MHz), as previously mentioned. More particularly, improved performance can be obtained by the use of a correlation receiver to more effectively measure the timing in a noisy environment, as it will be recognized by those skilled in the art.

Due to the inaccuracies of real clock components, clock frequencies at typical transmitter—receiver pairs are not identical. The Clock Error Estimator 218 is used to measure the deviation between the 1553 transmitter and OFDM receiver clock frequencies. The clock error estimate provided by this block is used by resampling functions of the Interference Canceller 230 to resample the primary signals for Basis Function estimation, as it will be further discussed. The clock error can be calculated by measuring the zero crossing times for each symbol and comparing this to the expected zero crossing times. This can be done using various state-of-the-art techniques, such as linear least square curve fitting. In this case, the slope of the best fit line yields the relative clock error (a slope of 1 indicates no error). Other known-in-the-art estimation methods may be used to estimate the clock error.

Interference Cancellation System with Impulse Response Modeling Using Least Mean Squares (LMS) Adaptive Filtering We now turn our attention to one possible implementation of the Interference canceller blocks 130, 230 in FIGS. 2 and 3, using an Impulse Response approach, based on (1) and using the Least Mean Square (LMS) adaptive filtering technique for determining the impulse response coefficients w. In general, LMS estimation is a technique for modeling a system by minimizing the mean square error between measurement data and data produced by the model. A preferred implementation uses a Finite Impulse Response (FIR) approach for adapting impulse response coefficients as closely as possible to the impulse response of the system. Other variants of LMS, such as Block LMS, Frequency domain implementations, infinite impulse respone (IIR), non-linear, variable step size, RLS are not excluded as possible implementations choices.

Figure 7A:
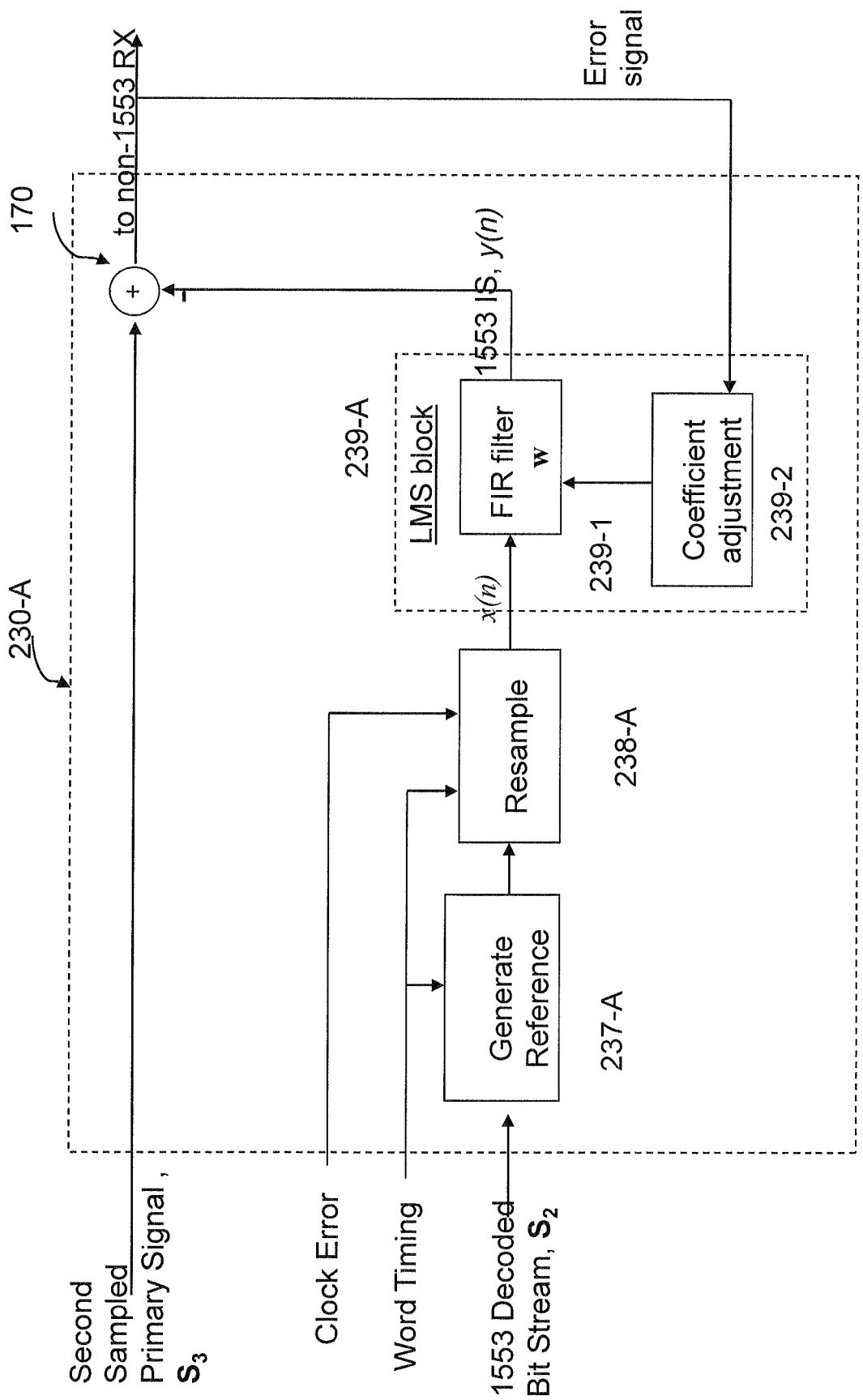
FIGS. 7A, 7B, 7C are block diagram of an interference cancellation system based on an impulse response method using an Least Mean Square (LMS) adaptive filter, in accordance with embodiments of the invention.
Figure 7B:
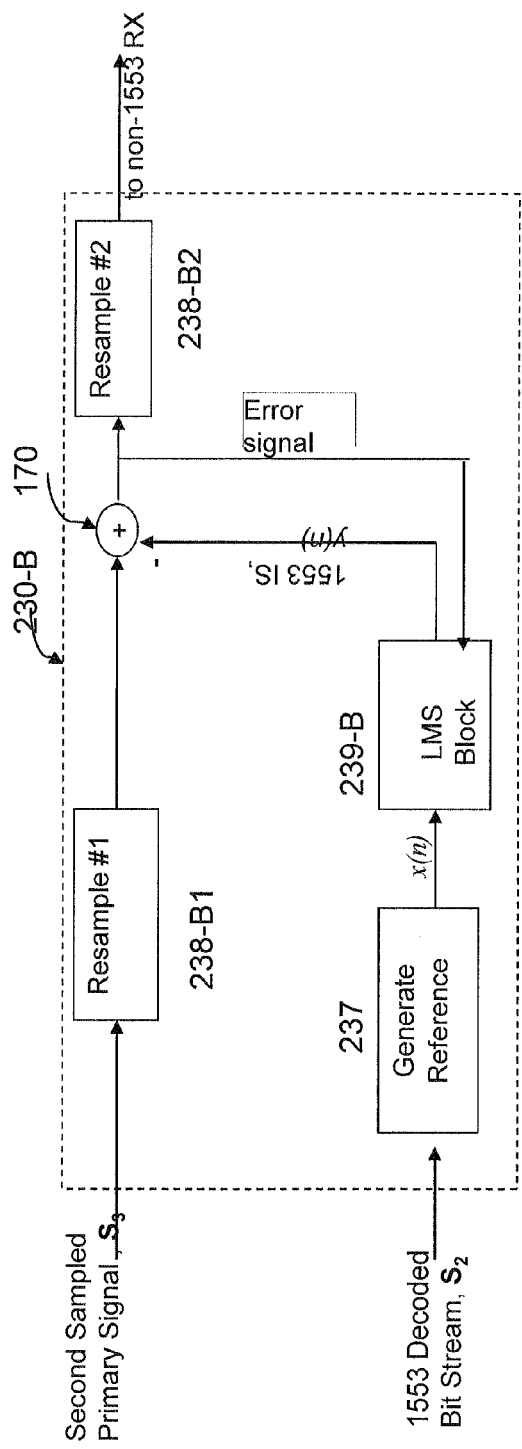
Figure 7C:
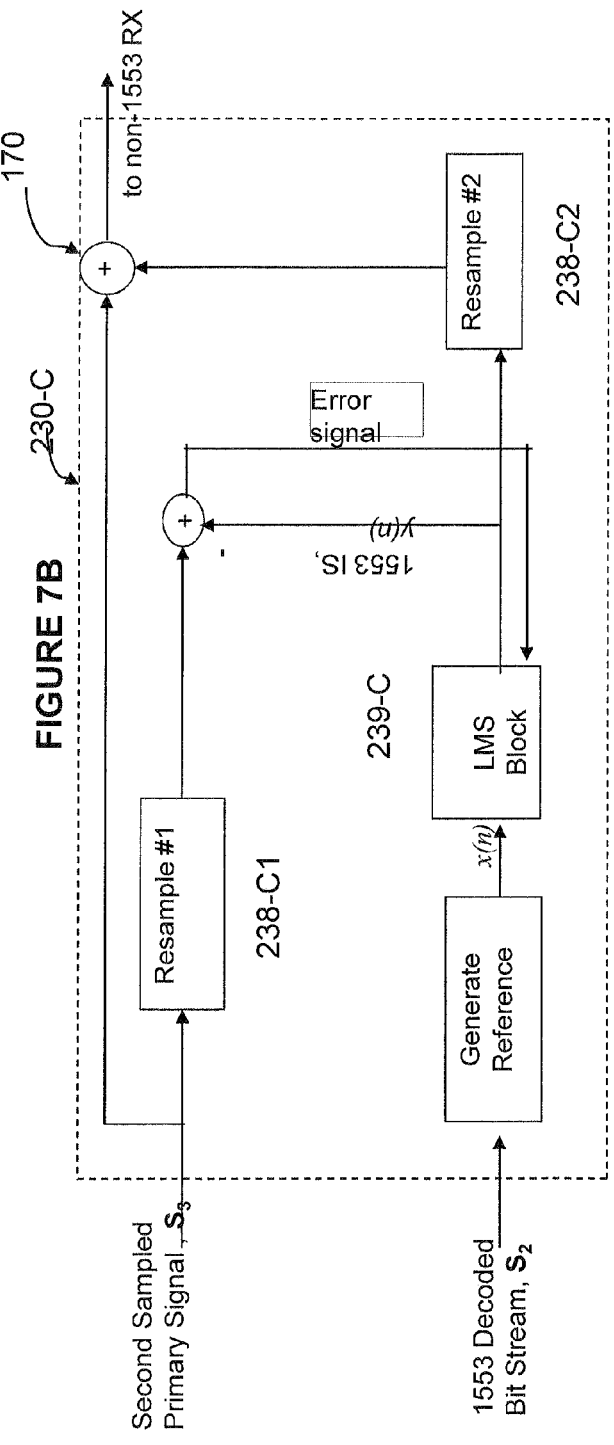

FIGS. 7A-7C are block diagrams of 1553 Interference Canceller block 230-A, 230-B, 230C using an Impulse Response approach based on the Least Mean Square (LMS) adaptive filtering technique. Referring specifically to FIG. 7A, the 1553 Interference Canceller 230-A comprises a reference signal generator 237-A, a resampler 238-A, an LMS block 239-A and Cancellation means 170.

Figure 8:
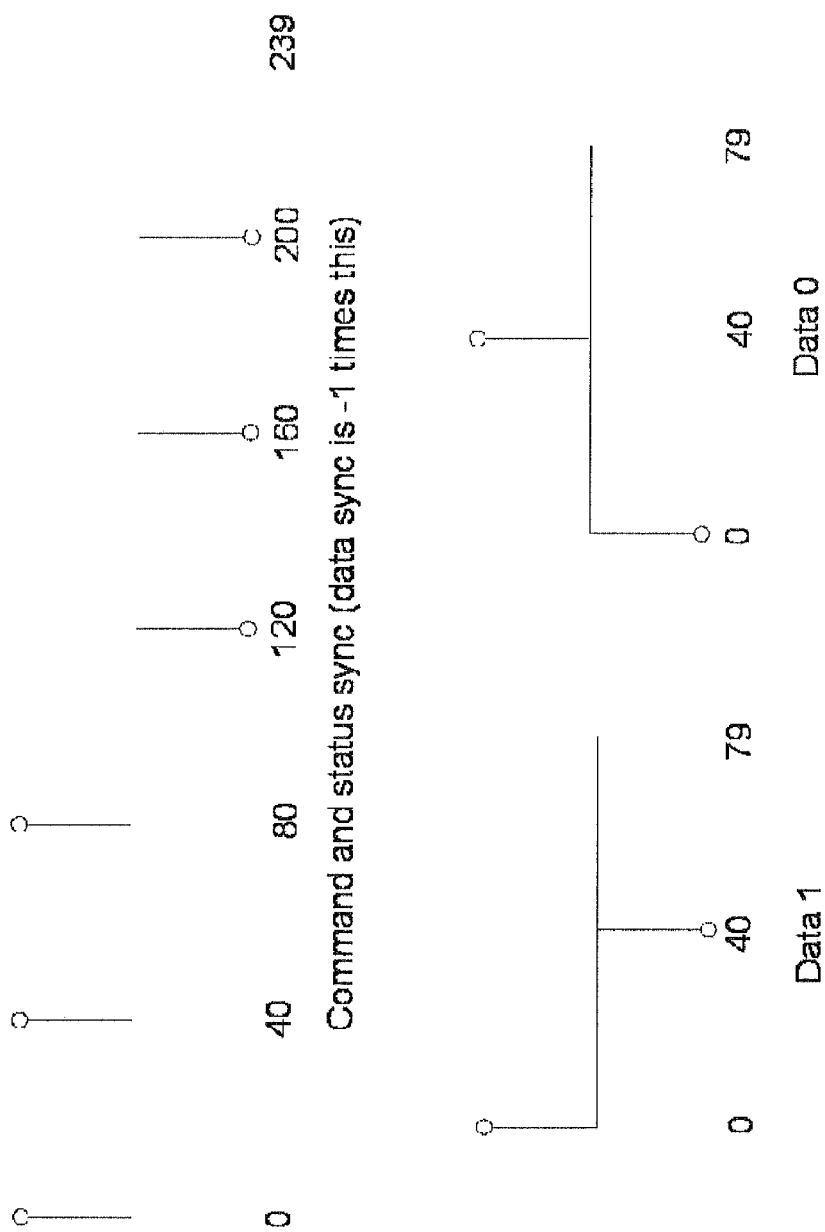
FIG. 8 illustrates impulse signal sequences used within the generate reference blocks of the systems in FIGS. 7A, 7B, 7C, according to an embodiment of the invention.

The reference generator block 237-A produces a 1553 reference signal based on the 1553 decoded bit stream $S_2$ and the word timing, an by using selected Command SYNC, Status SYNC, Data SYNC and data symbols impulse sequences such as in FIG. 8. Other 1553 input sequences may be used, as it will be recognized by those skilled in the art.

Since the 1553 transmitters do not have clocks synchronized with the interference measurement block 150, the Resample block 238-A uses the word timing and clock error estimate to resample the reference signal in adjusting for fractional timing errors and correcting the sampling rate. The output of the resample block 238-A is an interpolated or resampled reference signal x(n) with the correct timing and the sampling rate of the 1553 interference measurement block 150, which in this case is substantially the OFDM sampling rate.

The LMS block 239-A has an FIR filter 239-1 and a coefficient Adjustment block 239-2. Within the LMS block 239-A, an FIR filter 239-1 uses coefficients w generated by an LMS algorithm to perform a FIR filtering operation on the resampled reference input signal x(n) to synthesize a replica of the 1553 interference, y(n), as per equation (1) above.

The synthesized 1553 interference signal 1553 IS is subtracted from the second sampled primary signal $S_3$ within the cancellation means 170, producing an output signal $S_4$ comprising mainly the OFDM component, as illustrated in FIG. 4D. The output of the cancellation means 170 is also the error signal used as input to the Coefficient Adjustment block 239-2.

As an example, for a 1 MHz 1553 transmitter and an 80 MHz non-1553 receiver, the following LMS filtering operations are performed every 80 MHz sample:
1. Shifting a new reference signal sample into the x vector $$x(i+1)=x(i) \text{ for } i=0,2,\ldots,N-2$$

2. Setting x(0)=r where r is the reference signal sample.
3. Performing the FIR filtering operation (dot product) and calculating the error
4.

$$e = p - \sum_{i=0}^{N-1} x(i)w(i)$$

where p is the filtered primary signal sample.
5. Updating the filter coefficients Implementation of an LMS technique can be quite complex in the general case, where for an N length input sequence it may require about 2N multiplies for each output sample and the filter order N may be over 200. However, within the Interference Canceller block 230-A, the reference signal consists of a sequence of interpolated unit impulses and about three quarters of the points in this sequence are substantially zero. Consequently, there are only about N/4 non-zero multiplies necessary in steps 2 and 3 above. Advantageously the filter can also be designed in such a way that half of the multiplies are all by powers of 2 and hence can be implemented by bit shifts.

The Interference Canceller block 230-B in FIG. 7B uses a modified LMS implementation. In this implementation, the reference signal generated by the generate reference block 237 is fed directly to an LMS block 239-B, which produces a synthesized 1553 interference signal, 1553 IS.

For matching the sampling rate and synchronize timing of the 1553 interference signal and the second sampled primary signal $S_3$ at cancellation circuit 170, the second primary signal $S_3$ is resampled by resampling block 238-B1, to produced a resampled second primary signal $\check{S}_3$. In the preferred embodiment, the sampling rate of the resampled second sampled primary signal $\check{S}_3$ is modified to that there are exactly $F_{OFDM}/F_{1553}$ samples in each 1553 symbol. As the output difference or error signal is to be sent to an OFDM receiver, an up-sampling of this error or difference signal is performed by a second resampling block 238-B2, in producing a resampled difference signal. The output of the cancellation circuit is feedback to the LMS block 239-B, for allowing coefficient adjustment based on the LMS algorithm. The resampling blocks 238-B1 and 238-B2 also receive the clock error and the 1553 word timing estimator as inputs, but this detail has been omitted from the drawing for simplicity.

At first glance, the implementation in FIG. 7A may look simpler since it has only one resampler block. Furthermore the resampler 238-A is always resampling a unit impulse and so can be implemented using look-up table (LUT) accessing. However, the LMS block 239-B can be made to use less multiplies than the LMS block 239-A, as the LMS coefficient update within LMS block 239-B is:

$$w_{n+1} w_n + \mu e_n x_n$$

where $\mu$ is the LMS step size parameter and $e_n$ is the error signal. In FIG. 7B, every $40^{th}$ sample of x(n) is ±1 and the rest are zeros. This means that if $\mu$ is chosen as power of 2, one can just shift $e_n$ and then add or subtract it from w according to the sign of x. Therefore, there are only N/40 of these additions. The FIR filter operation is as in (1) and again this amounts to only N/40 adds or subtracts. Each LMS filter update can be done without any multiplies.

If the implementation of FIG. 7A is used, the resampled reference sequence is no longer just ±1 and there many more than 1 out of 40 non-zero values, depending on set threshold values, orders of interpolation with the LMS algorithm etc. For example, if 10 out of 40 non-zero values, there are about N/2 multiplies for each filter update, hence more than if using two resamplers as in the implementation of FIG. 7B as discussed.

The Interference Canceller block 230-C in FIG. 7C illustrates an alternative to the Interference Canceller block 230-B in FIG. 7B, in placing the resampling blocks 238-C1 and 238-C2 out of the paths of signals including a substantial OFDM components, in order to avoid unnecessarily resampling the OFDM signal twice and losing fidelity as a result. The Interference Canceller block 230-C also comprises LMS block 239-C.

Basis Functions

A novel system and method of calculating Impulse Response coefficients for a system by accumulating a small number of basis functions extracted from an output state of the system and solving for the impulse response coefficients w from these basis functions is provided by the present invention. In particular, for a 1553 cancellation system, one would extract basis functions from 1553 interfering signal. Without loss of generality, the concept of basis functions and of an impulse response system and method based on accumulated basis functions as it pertains to 1553 signals will be detailed.

In the next section, the impulse response technique using basis functions, in the context of 1553 interference cancellation, is described.

The terms "Basis Function", "basis functions", "1553 Basis Function" and "1553 basis functions" are used interchangeably in this description to define the possible waveforms that a 1553 signal can assume over sub-intervals of the 1553 signal. It will be recognized that based on this definition, Basis Functions that may correspond to same encoded data, such as [0 0 1], will have different analog representations from system to system, and depending on location within a system, such as at the transmitter, along a data bus, at a receiver, at an Interference Cancellations System. For example, two different transmitters will output slightly different 1553 waveforms for the same encoded data, due to manufacturing differences. Furthermore, various components in the path of a 1553 signal, such as filters, sampling devices, as well as channel effects, will render a 1553 signal at the transmitter to be different than a 1553 signal at or near a receiver. However, despite such differences in the analog domain, the preferred embodiment of the invention attempts to ensure that correspondence of Basis Functions with predefined encoded data sequences can be maintained and tracked, regardless of system and of location within the system. Therefore, a particular Basis Functions name will often comprise the predefined symbol sequence tag, e. g. [0 1 0], as well as an indicator of the location within the system, e. g. transmitter. When multiple transmitters are implied, a transmitter tag may also appear, however, most of the description would be carried on the assumption of a single given transmitter, except in the final section on Media Access Control (MAC) considerations.

In the preferred embodiment, Basis Functions are formed by decomposing a 1553 word at the SYNC and bit boundaries, as illustrated by solid vertical separation lines in FIG. 5. The choice to partition the signal at the SYNC and bit boundaries is natural but somewhat arbitrary in this context. An alternative would be to decompose signal into ½ bit intervals for example. Other partition choices and building functionally equivalent circuits should be obvious to someone skilled in the art.

Since the Manchester II Bi-Phase modulation scheme used in 1553 is of low complexity with a limited number of possible states, given by all the possible combinations of SYNC, data and parity symbols each with only 2 polarities, there are only a small number of 1553 symbol patterns that can be generated. This is also true for a 1553 signal that has been transmitted through a channel provided the channel is time invariant, but not necessarily linear. Consequently, it is possible to compile a catalog of a small number of basis functions which can be strung together to synthesize any possible received 1553 waveform. For the preferred embodiment choice of partitioning, with partition segments corresponding to 1553b symbols, a data symbol that is not next to a SYNC symbol is affected by only the previous data symbol and the next data symbol, due to bit transitions. A different choice of partitioning could be used where the waveform of one partition segment is affected only by the previous partition segment.

A standard transmitted 1553b word comprises trapezoidal waveforms, causing a 1553b symbol to interfere with the next one. In addition, a channel, which may include just the transmission medium and/or analog components of the transceiver, will typically cause a signal to spread out in time due to multi-path propagation effects. This temporal spreading of a 1553 signal would cause one symbol to further "interfere" with the next. This interference between symbols phenomenon is known to those skilled in the art as Inter-Symbol Interference (ISI). The following description considers the ISI to be limited such that only 3 symbols (3 bits periods) need to be considered when extracting a 1553 Basis Function. It should be obvious to someone skilled in the art that for greater or smaller ISI, more or less than 3 symbols could be considered, in a similar fashion.

Figures 9A, 9B:
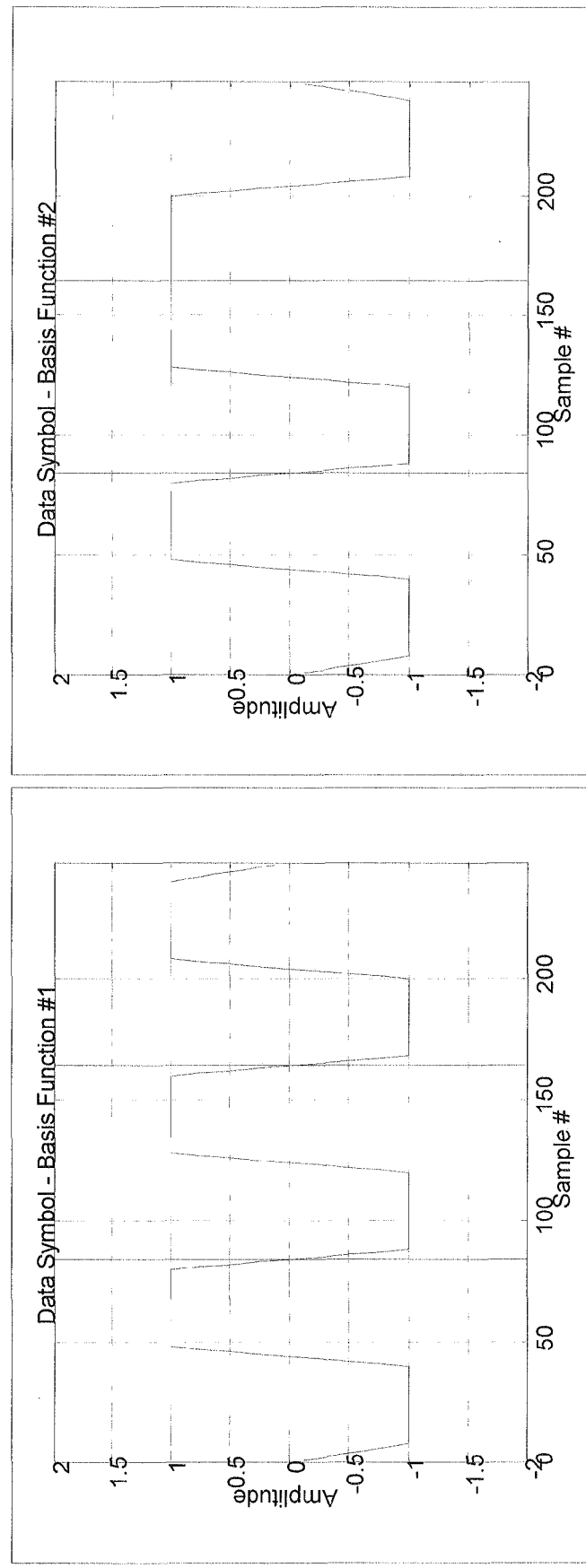
FIGS. 9A, 9B illustrate transmitted (Manchester II encoded) [0 0 0] and [0 0 1] 1553 Basis Functions.

When considering Basis Functions affected by 3 data symbols, there are a total of 8 possibilities representing bit combinations [0 0 0], [0 0 1], [0 1 0], [0 1 1], [1 0 0], [1 0 1], [1 1 0], [1 1 1]. As an example, the transmitted [0 0 0] and [0 0 1] 1553 Basis Functions are shown in FIGS. 9A, 9B.

Note that in most cases, half of the 1553 Basis Functions are substantially the negative of the other half (e.g. [0 0 0] is equivalent to −[1 1 1]), thereby reducing the number of unique Basis Functions required. Additionally, the extraction of the Basis Function can be offset from the middle of the three symbols long Basis Function and for a causal system would be delayed to capture the effect of the ISI.

Because a 1553 word starts with a SYNC symbol and multiple words can be concatenated to produce a longer message, there are additional Basis Functions required to entirely describe the signal. These include Basis Functions accounting for the first data symbol and the last data symbol in a word because one is preceded by a SYNC symbol and the other followed by no signal or another SYNC symbol, respectively. The SYNC symbol may also be preceded by no signal or the parity symbol of the previous word. The SYNC can also be positive or negative based on the type of 1553 word, such as a Command, Status or Data word. The possible symbol conditions for extracting SYNC Basis Functions are described in Table 1 and the symbol conditions for extracting the 1553 Basis Functions for the last parity bit are described in Table 2.

TABLE 1

| Final bits of previous word | SYNC | First Data Symbol |
|---|---|---|
| No signal | + | 0 |
| No signal | + | 1 |
| 00 | + | 0 |
| 01 | + | 0 |
| 10 | + | 0 |
| 11 | + | 0 |
| 00 | + | 1 |
| 01 | + | 1 |
| 10 | + | 1 |
| 11 | + | 1 |
| 00 | − | 0 |
| 01 | − | 0 |
| 10 | − | 0 |
| 11 | − | 0 |
| 00 | − | 1 |
| 01 | − | 1 |
| 10 | − | 1 |
| 11 | − | 1 |

TABLE 2

| Preceding data symbol | Parity bit | SYNC of next word |
|---|---|---|
| 0 | 0 | No signal |
| 0 | 1 | No signal |
| 1 | 0 | No signal |
| 1 | 1 | No signal |
| 0 | 0 | + |
| 0 | 0 | − |
| 0 | 1 | + |
| 0 | 1 | − |

TABLE 2-continued

| Preceding data symbol | Parity bit | SYNC of next word |
|---|---|---|
| 1 | 0 | + |
| 1 | 0 | − |
| 1 | 1 | + |
| 1 | 1 | − |

In practice, the effect of a SYNC symbol can be considered like the effect of a data symbol when extracting a 1553 Basis Function for the first data symbol or the parity symbol, thereby reducing the number of unique 1553 Basis Functions required.

Figure 9C:
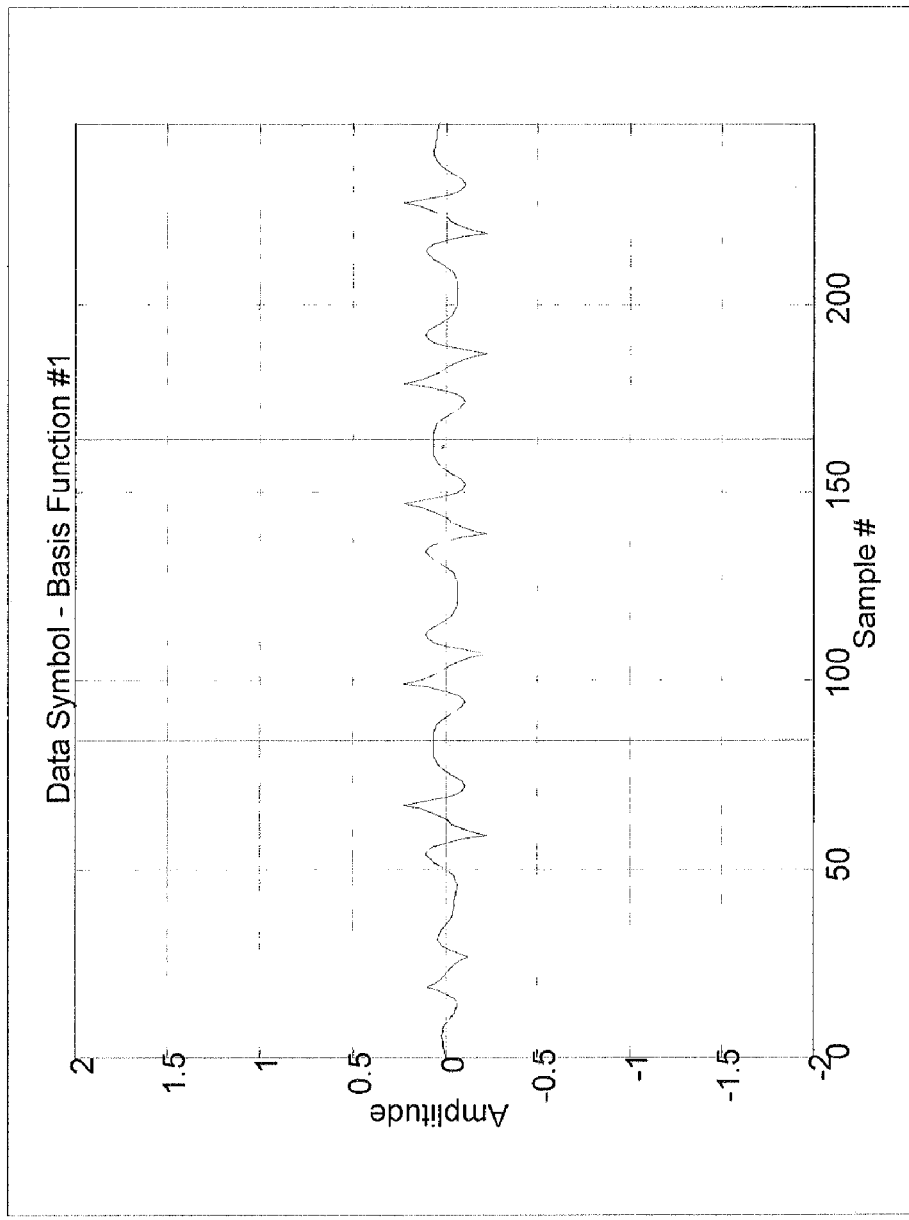
FIG. 9C illustrates a received band-pass filtered (Manchester II encoded) [0 0 0] 1553 Basis Function.

For the preferred embodiment, the band-pass filter (BPF) 68 and the separate A/D 69 are utilized for obtaining the second sampled primary signal $S_3$, as illustrated in FIG. 3. Consequently, 1553 components within signal $S_3$ have low amplitude and high frequency. Accordingly, a 1553 [0 0 0] Basis Function extracted from $S_3$ looks as illustrated in FIG. 9C.

Interference Cancellation—Impulse Response—Basis Function Method

Figure 10:
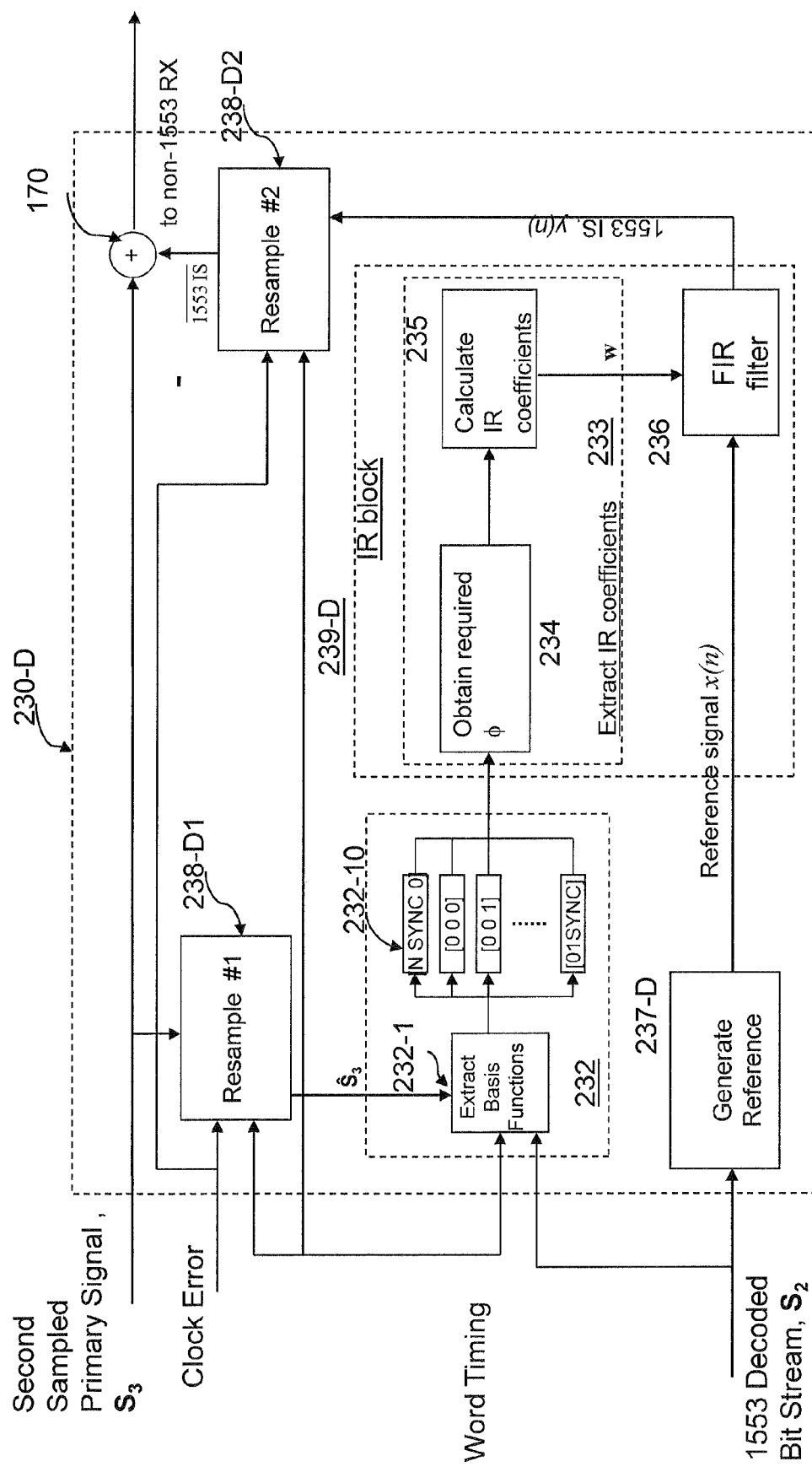
FIG. 10 is a block diagram of an interference cancellation system based on an impulse response method using Basis Functions, in accordance with a preferred embodiment of the invention.

FIG. 10 illustrates a block diagram of a 1553 Interference Canceller block 230-D based on a Basis Function/Impulse Response method. The 1553 Interference Canceller 230-D comprises a first resampler 238-D1, an accumulate 1553 Basis Functions block 232, an Impulse Response (IR) block 239-D, a second resampler 238-D2 and cancellation means 170. Within 1553 Interference Canceller block 230-D the IR coefficient vector w is determined by accumulating a small number of basis functions and solving for w directly from these.

The IR block 239-D has an obtain required φ sequence block 234, a deconvolution or calculate IR coefficients block 235, and a 1553 signal synthesizer/FIR filter 236. Although modeling the discrete linear system as a Finite Impulse Response (FIR) filter is detailed here, other state-of-the-art Impulse Response models, such as Infinite Impulse Response (IIR) models, are equally applicable.

The generate reference block 237-D and the two resampler blocks 238-D1 and 238-D2, are similar to those within the Interference Canceller 230-A based on Impulse Response via LMS. In the preferred embodiment, the generate reference block 237-D produces a reference signal x(n) based on special input sequences such as in FIG. 11 and based on the 1553 decoded bit stream $S_2$. A 1553 impulse sequence or reference signal x(n) thus constructed, an example of which is illustrated in FIG. 12a, when convolved with a pulse shaping filter sequences such as in FIG. 12b, produces a 1553 transmit word such as in FIG. 12c. This 1553 signal synthesis operation would take place as part of the Impulse Response block 239-D.

Figure 11:
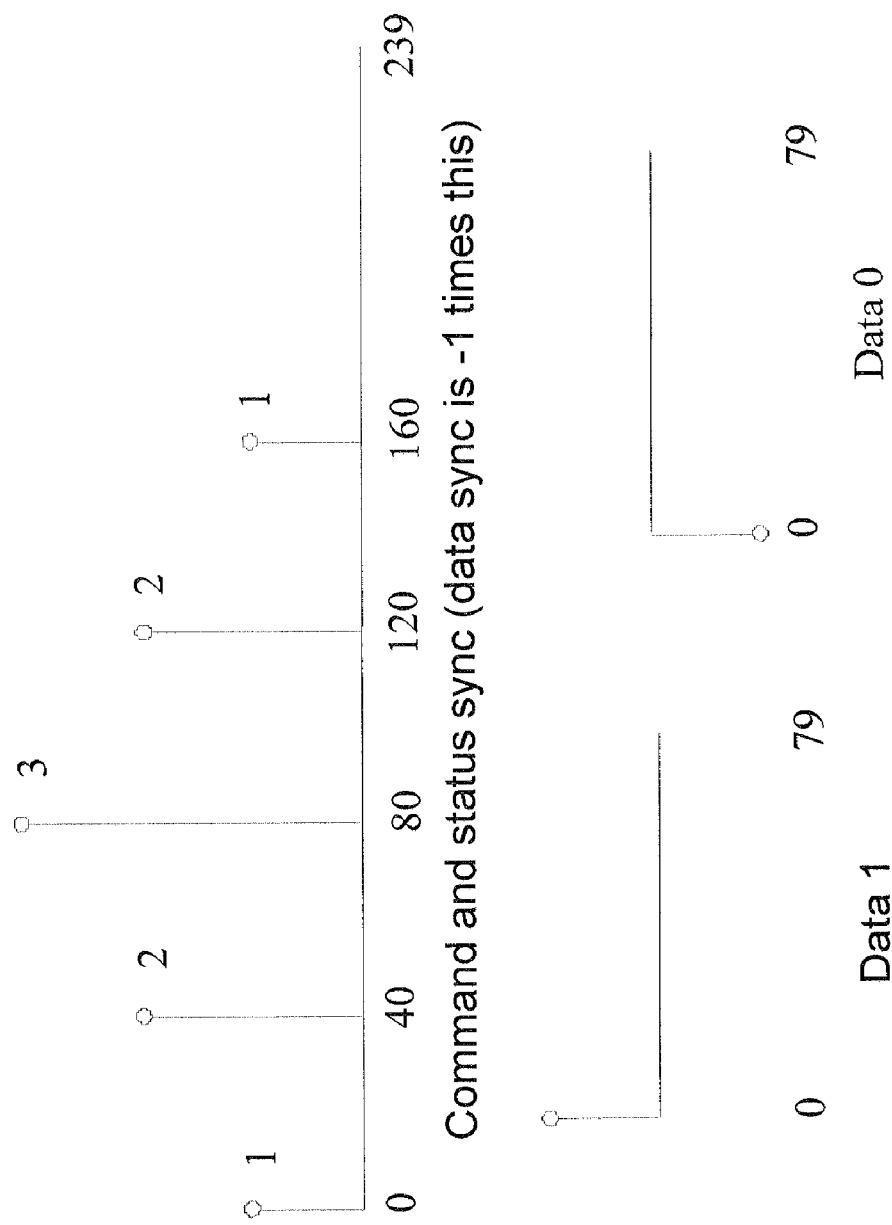
FIG. 11 illustrates impulse signal sequences used within the generate reference blocks of the systems in FIG. 10 according to an embodiment of the invention.
Figure 12A:
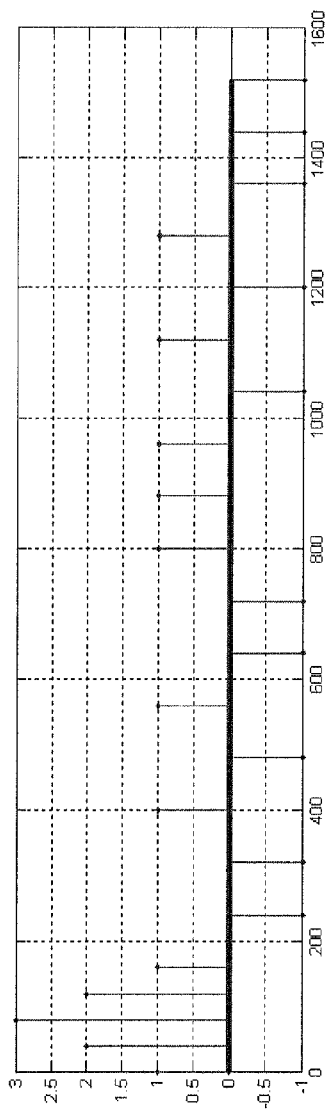
FIGS. 12A, 12B and 12C illustrates signals used in modeling a 1553 transmitter within the IR block in FIG. 10; In particular.
Figure 12B:
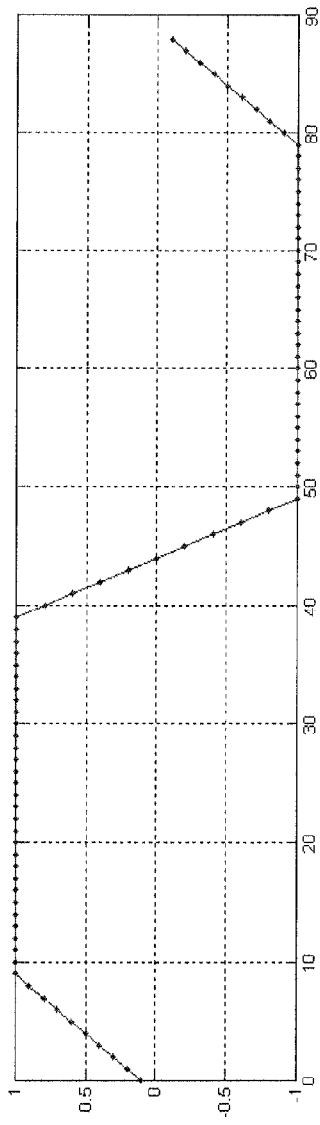
Figure 12C:
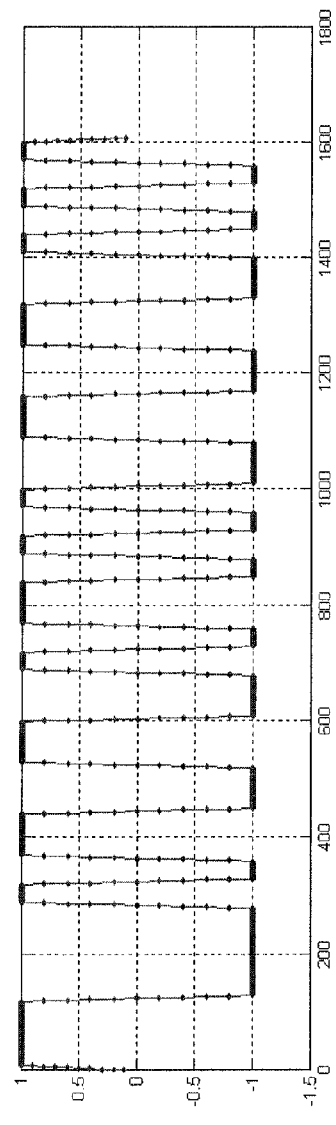
Figure 13A:
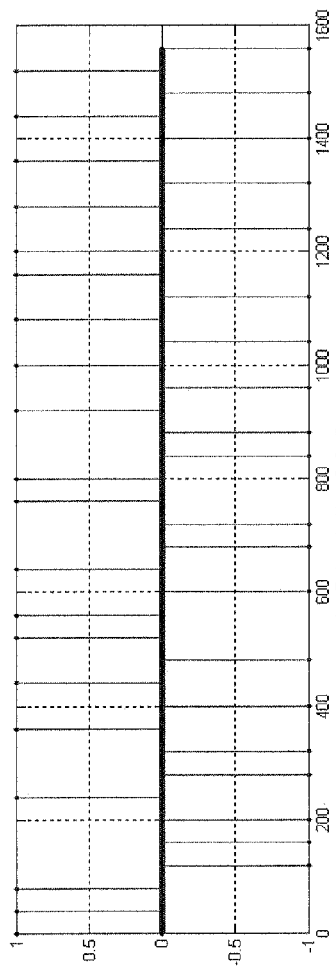
FIGS. 13A, 13B and 13C illustrates alternate signals used in modeling a 1553 transmitter within the IR block in FIG. 10; In particular.
Figure 13B:
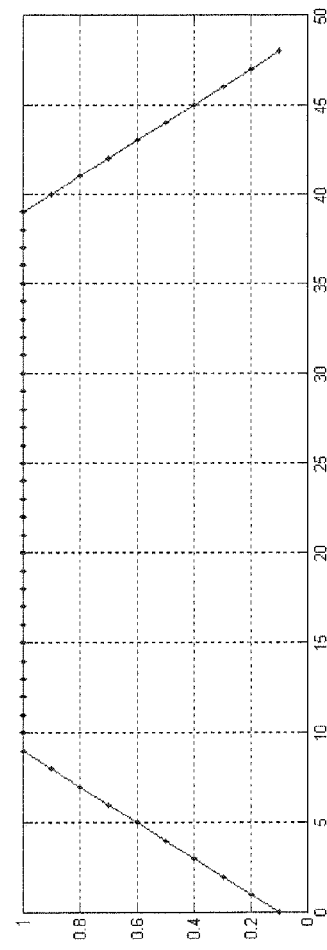
Figure 13C:
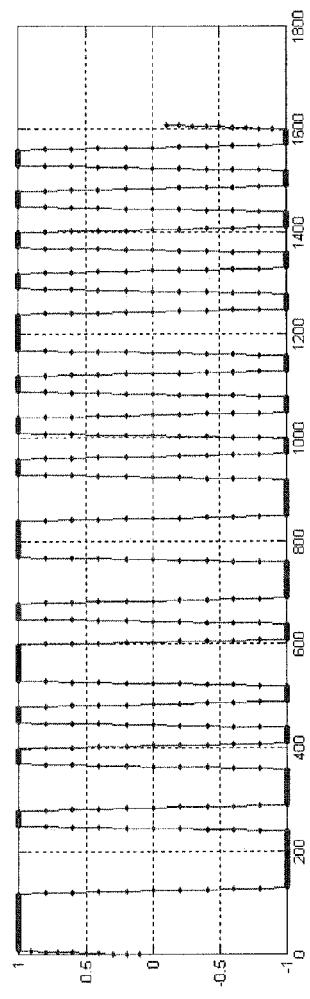

In the embodiment of FIGS. 11 and 12a, the reference sequence x(n) is composed of impulses spaced by 80 samples in the data segment of a 1553 word. Due to the symmetry in the 1553 pulse shape of some embodiments, it is also possible to generate a 1553 word using a reference sequence with impulses spaced at 40 samples, such as based on special sequences shown back in FIG. 8. A 1553 impulse sequence or reference signal x(n) thus constructed, an example of which is illustrated in FIG. 13a, when convolved with a pulse shaping filter sequences such as in FIG. 13b, produces a 1553 transmit word such as in FIG. 13c. To distinguish the two embodiments, the Basis Function technique using impulses spaced 80 samples is referred to as $BF_{80}$ and the Basis Function technique using impulses spaced 40 samples is referred to as BF$_{40}$. BF$_{80}$ will be first described in detail. Differences pertaining to BF$_{40}$, in comparison with BF$_{80}$, will be highlighted later on.

The first resampler 238-D1 produces a resampled second sampled primary signal $\hat{S}_3$, with sampling rate and word/symbol timing adjusted such as for allowing extraction of basis functions from itself upon examination of 1553 decoded data S$_2$, as described next. The second resampling block 238-D2 resamples the synthesized 1553 interference signal produced by the IR block 239-D, effectively undoing the sampling rate and timing changes of the first resampling block 238-D1. The resultant resampled 1553 interference signal, 1553IS is subtracted from the second sampled primary signal S$_3$ within the cancellation means 170, producing an output signal S$_4$ comprising mainly the OFDM component, as illustrated in FIG. 4D. In an analogous manner to the IR via LMS implementations, placing the resampling blocks at different locations within the system is possible.

An Extract Basis function block 232-1 within the Accumulate Basis function block 232 receives the resampled primary signal $\hat{S}_3$ and the 1553 decoded bit stream S$_2$, identifies transmitted Basis Functions within S$_2$ and extracts the corresponding waveform from within $\hat{S}_3$ and sends it to a corresponding averaging buffer 232-10, also within the Accumulate Basis function block 232. Within the Extract Basis function block 232-1 the decoded bits and SYNC polarity are used to identify the Basis Function and to determine in which buffer to integrate them. The Basis Functions are extracted from $\hat{S}_3$ in the presence of noise and averaged over multiple 1553 words. OFDM transmissions and some noise will appear to be uncorrelated to these signals and will average out from the estimates. It will be recognized by those skilled in the art that the operation of averaging Basis Functions within a buffer may be implemented in various ways. For example, one can use linear averaging, exponential averaging, etc. Also, an updating mechanism may be associated, such that for a buffer holding N basis functions, the first basis function extracted is discarded when an N+1$^{th}$ is available to enter the buffer. Furthermore, there might be fill-in periods for a buffer, such as when filling in a buffer for the first time or after a reset, that might follow a long idle time, for example.

Returning to the idea of resampling, feeding a resampled primary signal $\hat{S}_3$ to the Accumulate Basis Function block 232, ensures that Basis Functions that are extracted from different locations in the resampled primary signal $\hat{S}_3$ are aligned sufficiently for proper averaging. For example, for an OFDM receiver clocking at 80 MHz and a 1553 transmitter transmitting at 1 MHz, it is desired that 1553 data/parity symbols are resampled to be exactly 80 samples long and that SYNC symbols are resampled to be exactly 240 samples long, namely 3 times longer than a data/parity symbol. The Basis Functions are estimated in the presence of noise and averaged over multiple 1553 words. OFDM transmissions will appear to be uncorrelated to these signals and will average out from the estimates.

The accumulated Basis Functions are used by the 1553 Synthesis block 236 along with the 1553 decoded bit stream to reconstruct the decoded signal interference in the high frequency band, but in this case, without the noise and OFDM signal components which have substantially averaged out in extracting the basis functions. In the Interference Cancellation via the Direct Basis Function Method, the 1553 signal synthesis is essentially the inverse of the Basis Function extraction. The SYNC polarity and data/parity the bit sequences are used to determine the order in which Basis Functions are strung together to reconstruct the 1553 interference.

The IR block 239-D comprises an Obtain required Φ block 234, a Calculate IR coefficients block 235 and an FIR filter 236. The Extract IR coefficients block 235 is based on the assumption that the 1553 channel can be represented by (1) as well as based on the assumption that 1553 symbol waveforms can be represented by Basis Functions and by the associated 1553 symbol sequences at any point within the system. Thus, the impulse response w may be obtained by solving the following matrix equation:

$$\psi w = \phi \qquad (3)$$

where ψ is a matrix constructed based on 1553 symbol sequences that have associated basis functions, and φ is a vector of these associated accumulated basis functions. In this case, IR coefficients can be extracted as follows:

1. Selecting a valid 1553 symbol sequence and partitioning this sequence into predefined symbol sub-sequences that have Basis Functions associated, and constructing an input matrix ψ based on these symbol sub-sequences.
2. Constructing vector φ selecting Accumulated 1553 Basis Functions corresponding to the 1553 symbol sequences in ψ within the φ selection block 234.
3. Solving for the IR coefficients w from (3) within the Calculate IR block 235.

Special advantageous selections of predetermined 1553 symbol sequences with associated basis functions and construction of ψ based on these are possible, such as for allowing for reduction of storage requirements and computation complexity, for further averaging of noise effects in synthesizing a 1553 interference signal.

Advantageously, an overdetermined system representing the matrix equation in (3) may be constructed, therefore accounting for more of the received waveform via accumulated basis functions within φ and thus further averaging out noise effects, in addition to the averaging effect that have already taken place in obtaining each particular accumulated basis function.

Furthermore, ψ can be advantageously constructed such that its inverse or its pseudo inverse is a constant multiplied by its transpose.

In some cases, implementing the Extract IR coefficients block 233 based on a circular convolution form of equation (1) as it will be detailed below may provide additional benefits.

The FIR filter 236 uses the IR coefficients and transforms the input reference signal x(n) into a 1553 interference signal, 1553 IS.

Obtaining FIR Coefficients Using Accumulated Basis Functions

Next, we detail by way of example advantageous techniques of obtaining impulse coefficients w from accumulated basis functions.

Assuming 1553 signaling at about 1 MHz and a sample rate of 80 MHz in the IC and also assuming the non-zero portion of the combined impulse response is less than three 1553 symbols in duration so N can be set to 3×80=240. In this case, an accumulated basis function extracted from samples n to n+79 of the resampled second sampled primary signal $\hat{S}_3$ (n), where n is the position of most recent sample of the non-zero impulse, is affected by the three most recent non zero input values which in turn are given by the three most recent 1553 bits. Such a basis function can be designated as $$\phi_i = [\hat{S}_3(n)\hat{S}_3(n+1) \ldots \hat{S}_3(n+N-1)]^T$$

where the subscript i is a basis function tag derived as follows from the three bits that affect the basis function:

$$i = [b_0 b_1 b_2][4\ 2\ 1]^T + 1 \qquad (4)$$

where $b_0$ is the most recent bit, $b_1$ the second most recent and so on. This basis function tagging scheme as it relates to the most recent bit values and the most recent non-zero values in the input sequence is summarized in Table 3.

TABLE 3

Basis function tagging scheme

| Three most recent bit values $b_0 b_1 b_2$ | Most recent non-zero input sequence values | Basis function tag i |
|---|---|---|
| 0 0 0 | −1 −1 −1 | 1 |
| 0 0 1 | −1 −1 1 | 2 |
| 0 1 0 | −1 1 −1 | 3 |
| 0 1 1 | −1 1 1 | 4 |
| 1 0 0 | 1 −1 −1 | 5 |
| 1 0 1 | 1 −1 1 | 6 |
| 1 1 0 | 1 1 −1 | 7 |
| 1 1 1 | 1 1 1 | 8 |

Under this assumptions, the following matrix equation can be written for basis function $\phi_2$:

$$\Psi_2 w = \phi_2 \quad (5)$$

$\Psi_2$ is a 80 by 240 matrix formed from three diagonal sub-matrices as follows $$\Psi_2 = \begin{bmatrix} \begin{bmatrix} -1 & 0 & 0 & \cdots & 0 \\ 0 & -1 & 0 & \cdots & 0 \\ \vdots & \vdots & \vdots & \ddots & \vdots \\ 0 & 0 & 0 & \cdots & -1 \end{bmatrix} \end{bmatrix} \quad (6)$$

$$\begin{bmatrix} -1 & 0 & 0 & \cdots & 0 \\ 0 & -1 & 0 & \cdots & 0 \\ \vdots & \vdots & \vdots & \ddots & \vdots \\ 0 & 0 & 0 & \cdots & -1 \end{bmatrix} \begin{bmatrix} 1 & 0 & 0 & \cdots & 0 \\ 0 & 1 & 0 & \cdots & 0 \\ \vdots & \vdots & \vdots & \ddots & \vdots \\ 0 & 0 & 0 & \cdots & 1 \end{bmatrix}$$

Each of the sub-matrices has its diagonal element determined by one of the three most recent bit values. The diagonal element in the first (leftmost) sub-matrix determined from $b_0$, the second from $b_1$ and so on. Each row of the matrix is all zeros except for a plus or minus one every $40^{th}$ position and each row is a right cyclic shift of the row above.

The matrix is also labeled with the subscript derived from the bit values as in (4).

This matrix equation does not have a unique solution however it can be supplemented with two other basis function equations as follows:

$$\Psi w = \begin{bmatrix} \Psi_1 \\ \Psi_2 \\ \Psi_3 \end{bmatrix} w = \begin{bmatrix} \phi_1 \\ \phi_2 \\ \phi_3 \end{bmatrix} = \phi \quad (7)$$

The extended $\psi$ matrix in (7) is square and non-singular so a unique solution for the FIR coefficient vector w can be obtained. Furthermore, solving (7) is simple since the inverse of $\psi$ has only two non-zero entries in each row meaning that each coefficient in the w vector can be computed by summing two elements of the $\phi$ vector in (8).

If the received interfering signal is noiseless the above is sufficient. However, in using accumulated basis functions as described above, the effects of noise can be reduced by averaging over more of the received interfering waveform. The fact that $$\phi_i = -\phi_{9-i}, \, i=5,6,7,8 \quad (8)$$

can advantageously be used to further average the basis functions tagged 5 to 8 with those tagged 1 to 4. Lastly, the matrix equation (7) can be further extended as follows $$\Psi' w = \begin{bmatrix} \Psi_1 \\ \Psi_2 \\ \Psi_3 \\ \Psi_4 \end{bmatrix} w = \begin{bmatrix} \phi_1 \\ \phi_2 \\ \phi_3 \\ \phi_4 \end{bmatrix} = \phi' \quad (9)$$

so that all 8 possible basis functions of this example are now included allowing more of the received waveform to be included in the averaging and hence further reducing noise effects. Now, the size of the $\psi'$ matrix in (9) is 320×240 so this is an overdetermined system that can be solved using the pseudo-inverse.

$$w = \text{pinv}(\psi')\phi' \quad (10)$$

Because of the way the $\psi'$ matrix is constructed, the pseudo inverse has four non-zero entries of equal magnitude in each row meaning that four elements of the $\phi'$ matrix are summed to produce each element of w. In fact the pseudo-inverse is merely the scaled transpose of $\psi'$.

$$\psi'^{-1} = \psi'^T / 4 \quad (11)$$

The procedure outlined here can be extended for N equal to any number of 1553 symbol lengths. For example with N=320 or four 1553 symbols, there are 8 basis functions in the $\phi'$ vector and the $\psi'$ matrix in the overdetermined system in (9) is of dimension 640×320. This would lead to 8 non-zero entries in each row of the pseudo-inverse and which could be computed by transposing the $\psi$ matrix and dividing by 8.

As previously mentioned, an alternative is to use the $BF_{40}$ technique instead of the $BF_{80}$ technique described above. A possible way to proceed with the $BF_{40}$ technique is to use 40 sample long basis functions and treat the extra impulses as extra data bits interleaved with the actual data bits. This technique must deal with bit sequences that are twice as long as the $BF_{80}$ technique for an impulse response of the same length. Also, not all bit sequences will be represented. In the data portion of the 1553 word, no bit sequences with three or more consecutive bits being the same are possible. Therefore, in this case, some of the $\Psi$ submatrices will be missing from equation (9) and the simple relation in (11) for the pseudo inverse would no longer hold.

An alternative $BF_{40}$ technique is to use 80 sample accumulated basis functions, but assume that the non-zero duration of the impulse response is 80×(2i−1)/2 when there are i bits affecting each basis function. For i=3, the convolution that produces the basis function $\phi_2$ would take the same form as (5) but with $\Psi_2$ being the following 80×200 matrix (only the non-zero matrix entries are shown and there are 39 zeros between the non-zero entries in each row or column):

$$\Psi_2 =$$

$$\begin{bmatrix} -1 & & & 1 & & -1 & & -1 & & 1 & \\ & -1 & & & 1 & & -1 & & -1 & & 1 \\ & & -1 & & & 1 & & -1 & & -1 & & 1 \\ & & & -1 & & & 1 & & -1 & & -1 & \\ 1 & & & & -1 & & & 1 & & -1 & & -1 \\ 1 & & & & & -1 & & & 1 & & -1 & -1 \\ & 1 & & & & & -1 & & & 1 & & -1 & -1 \\ & & 1 & & & & & -1 & & & 1 & & -1 \end{bmatrix}$$

In this case, equation (5) can be extended as in (7) and solved for w using the pseudo inverse. This allows all of the possible accumulated basis functions to be used.

Another variation of the $BF_{80}$ technique described above solves for w by performing a circular deconvolution. A circular convolution equation can be written as:

$$\psi(n) * w(n) = \phi(n), \quad (12)$$

This can be solved for w(n) in the frequency domain using the FFT and IFFT. Advantageously, in order to eliminate the need for FFT and IFFT operations, the function $\psi(n)$ is chosen as the 320 point sequence given by $$\psi(n) = \begin{cases} 1, & n = 0 \\ 1, & n = 80, 160, 240 \\ 0, & \text{otherwise} \end{cases} \quad (13)$$

Figure 14:
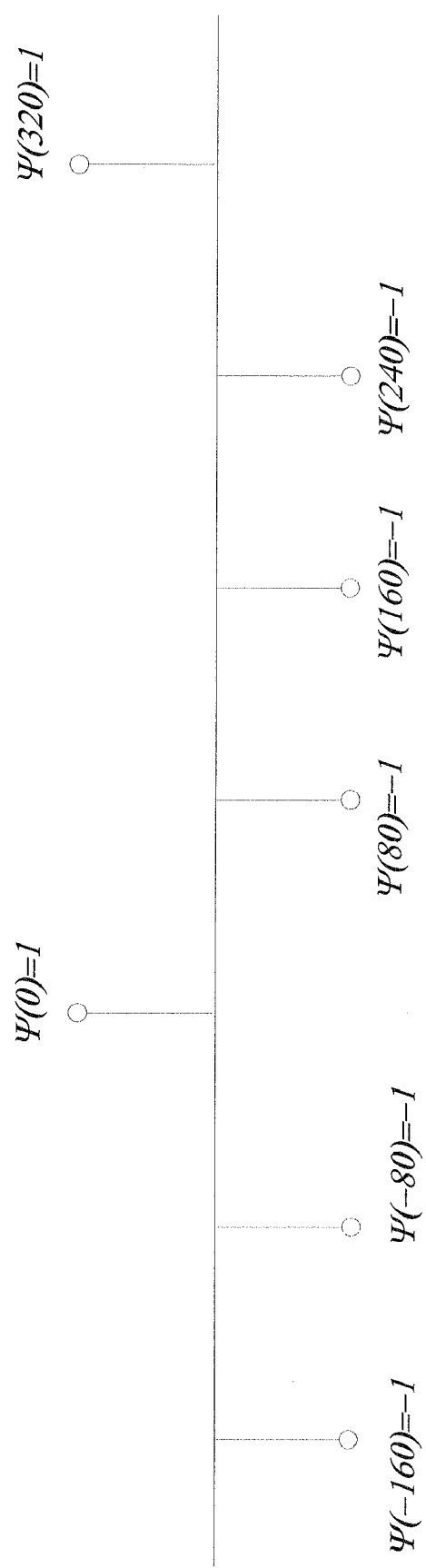
FIG. 14 illustrates a $\psi$ series used in a circular convolution implementation of the Extract IR coefficients block for the system in FIG. 10.

The function $\phi(n)$ is formed by concatenating accumulated basis functions in such a way that they form a single period of the signal that would be produced by a periodic extension of $\psi(n)$. For the case where the non-zero portion of w(n) is less than three 1553 symbols in duration, there are 8 basis functions. FIG. 14 shows a periodic extension of $\psi(n)$ indicating that the three non-zero values affecting the points $\phi(0)$ to $\phi(79)$ are 1, −1 and −1 corresponding to the bit sequence 100. Consequently this portion of $\phi(n)$ is set equal to the basis function $\phi_5 = -\phi_4$. The next 80 points of $\phi(n)$ are affected by the non-zero $\psi(n)$ values −1, 1, −1 corresponding to bit sequence 010 so $\phi_3$ is used here. Similar reasoning indicates that the final 160 points of $\phi(n)$ are filled by $\phi_2$ and $\phi_1$. At this point the basis functions tagged 1 to 4 are all used and because of relation (9), all basis functions are used.

The impulse response w(n) can be obtained by circular deconvolution which is easily implemented using the discrete Fourier transform (DFT).

The circular convolution can also be written as the following matrix equation.

$$\begin{bmatrix} \psi(0) & \psi(N-1) & \psi(N-2) & \cdots & \psi(1) \\ \psi(1) & \psi(0) & \psi(N-1) & \cdots & \psi(2) \\ \psi(2) & \psi(1) & \psi(0) & \cdots & \psi(3) \\ \vdots & \vdots & \vdots & \ddots & \vdots \\ \psi(N-1) & \psi(N-2) & \psi(N-3) & \cdots & \psi(0) \end{bmatrix} w = \phi \quad (14)$$

where, $$\phi = [\phi(0) \quad \phi(1) \quad \cdots \quad \phi(N-2) \quad \phi(N-1)]^T \quad (15)$$

$$w = [w(0) \quad w(1) \quad \cdots \quad w(N-2) \quad w(N-1)]^T \quad (16)$$

The matrix $\Psi$ in (15) is non-singular and its inverse is also given by (12). Furthermore each row of the inverse has only 4 non-zero entries so each point of w is computed by summing 4 elements of the $\phi$ vector.

This procedure can be extended to the case where there non-zero portion of the impulse response is up to 4 1553 symbols in duration. In this case only half of the 16 possible basis functions are included in the equation so less of the received waveform is used for averaging.

Media Access Controller (MAC) Implications

In a typical 1553 network, there are multiple 1553 transmitters which from an non-1553 receiver point of view have different impulse responses. An Interference Cancellation system according to the embodiments of the invention operates independently on each 1553 interference source. Therefore, advantageously, accumulated Basis Functions, clock error estimates, IR coefficients as well as other possible interference cancellation parameters can be calculated, integrated and stored for each transmitter $TX_i$ on the network, as $IC_{TXi}$. Furthermore, standard 1553 networks operate with a command/response media access and only one 1553 device transmits at a time, with a Bus Controller broadcasting which remote transmitter $TX_i$ will be transmitting next. This a priori information can be used to preload $IC_{TXi}$ information for applying it for Interference cancellation, thereby reducing the latency and buffering required for decoding a 1553 message before passing the signal to a non-1553 receiver. 1553 messages also contain source address information which can be used to identify particular transmitters. In the preferred embodiments, 1553 timing is calculated for each word/message.

Time can be reserved where there are non-1553 modem does not transmit in order to train interference cancellation parameters to obtain better estimates. Alternately, the training can be done with non-1553 signaling on the bus and integration time constants can be adjusted to meet the particular fidelity requirements of the bus configuration and application.

Bus Redundancy 1553 is generally utilized for hard real time communications, where a message is expected to be communicated over the bus in a deterministic way with known latency and very low probability that the message is not decoded successfully. For such critical communications, MIL-STD-1553 specifies a primary data bus and a redundant (default) bus, providing communications path redundancy ("dual bus redundancy"). For dual redundant bus applications, 1553 requires that a 1553 receiver (not shown) be capable of listening to and decoding commands on the primary and the redundant bus at the same time. A 1553 terminal (not shown) transmits 1553 signals on only one bus at a time. Redundancy can be extended to more than 2 buses.

Figure 15:
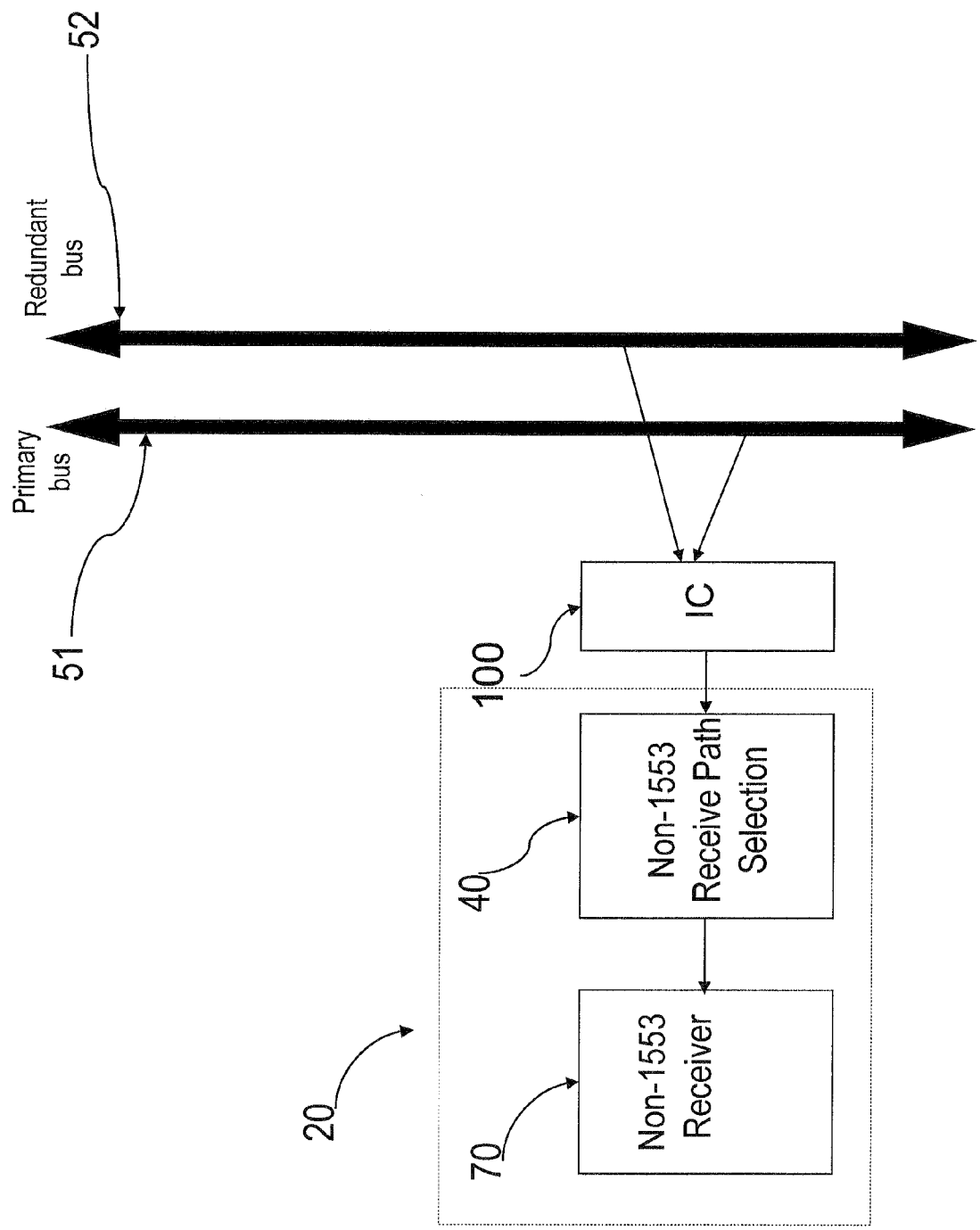
FIG. 15 is a block diagram of an Interference Cancellation system according to the invention, operating in conjunction with a non-1553 receiver in a dual redundant scheme.

Co-assigned U.S. patent application Ser. No. 11/419,742, describes a dual redundant system and method in the case of a 1553 communication system comprising a non-1553 communication overlay network. On such a network, a non-1553 terminal may have the same topology as a standard 1553 terminal, comprising a receiver associated with each bus and receiving on both buses concurrently. Alternatively, as illustrated in FIG. 15, a non-1553 terminal 20 may comprise a single non-1553 receiver 70 along with a receive path selection block 40. Within the receive path selection block 40, a decision based on predefined selection criteria is made regarding establishing a receive path between the single non-1553 receiver of the terminal and one of the data buses 51, 52.

The 1553 Interference Cancellation architecture according to the present invention can be associated with non-1553 receivers in various ways that would be obvious to someone skilled in the art. However, preferably, the Interference Cancellation system 100 is electrically connected to primary and redundant buses in the non-1553 frequency band and performs interference cancellation of the 1553 signals on non-1553 signals to be decoded at the non-1553 receiver in advance of selecting a receive path between the non-1553 receiver and one of the buses. This configuration provides flexibility in allowing the non-1553 receiver to operate in various configurations, either receiving from one bus at a time or receiving from both busses concurrently, while still having 1553 interference signals cancelled out, regardless of possible timing issues related to switching between buses.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. Within a 1553 communication system comprising a data bus carrying primary signals having a 1553 component and a non-1553 component, an interference cancellation system comprising:
    an input port for receiving a sampled primary signal from the data bus, via an analog-front end block comprising sampling means;
    a 1553 data extraction block connected to said input port, for extracting 1553 data from said sampled primary signal and for outputting 1553 decoded data; and
    an interference cancellation circuit comprising:
        an interference measurement block for receiving said 1553 decoded data and said sampled primary signal, said interference measurement block comprising an impulse response block for producing an interference signal based on a 1553 impulse response system model and a generate reference block for producing a reference signal based on said 1553 decoded data and based on predetermined impulse sequences and wherein said impulse response block receives said reference signal; and
        a cancellation block for subtracting the interference signal from the sampled primary signal and for producing an output signal with the 1553.

2. The interference cancellation system of claim 1, wherein said impulse response block comprises finite impulse response (FIR) filter for producing said interference signal based on determined impulse response coefficients.

3. The interference cancellation system of claim 1, wherein said impulse response block comprises infinite impulse response (IIR) filter for producing said interference signal.

4. The interference cancellation system of claim 1, wherein said impulse response block comprises an adaptive filter for determining impulse response coefficients and for producing said interference signal.

5. The interference cancellation system of claim 4, wherein said adaptive filter uses a Least Mean Square (LMS) algorithm.

6. The interference cancellation system of claim 5, wherein said Least Mean Square (LMS) algorithm uses a step size parameter that is a power of 2.

7. The interference cancellation system of claim 1, wherein said interference measurement block further comprises a resampler for producing a resampled reference signal.

8. The interference cancellation system of claim 1, wherein said analog-front-end comprises first sampling means for producing a first sampled primary signal sent to said 1553 data extraction block and second sampling means for producing a second sampled primary signal sent to said interference cancellation circuit.

9. The interference cancellation system of claim 8, wherein said interference cancellation circuit further comprises a first resampler for resampling said second sampled primary signal in producing a resampled second sampled primary signal and a second resampler for resampling said output signal in producing a resampled output signal.

10. The interference cancellation system of claim 8, wherein said interference cancellation circuit further comprises a first resampler for resampling said second sampled primary signal in producing a resampled second sampled primary signal and a second resampler for resampling said interference signal in producing a resampled interference signal.

11. The interference cancellation system of claim 1, wherein said interference measurement block further comprises an accumulate basis functions block for accumulating basis functions and wherein said impulse response block comprises an extract impulse response (IR) coefficients block for calculating impulse response coefficients w based on said accumulated basis functions.

12. The interference cancellation system of claim 11, wherein said extract IR coefficients block comprises means for calculating impulse response coefficients w based on a matrix equation $\psi w = \phi$, wherein $\phi$ is an invertible matrix constructed based on predefined 1553 symbol sequences that have associated basis functions, and $\phi$ is a vector of said associated basis functions.

13. The interference cancellation system of claim 12, wherein said matrix equation represents and overdetermined system.

14. The interference cancellation system of claim 13, wherein said matrix $\psi$ is constructed such that it has a pseudo-inverse that is a constant multiplied by the transpose of matrix $\psi$.

15. The interference cancellation system of claim 11, wherein said extract IR coefficients block comprises means for calculating impulse response coefficients w based on a circular deconvolution.

16. The interference cancellation system of claim 11, wherein an impulse response block comprises an autocorrelation of said input sequence $\psi(n)$ as a unit impulse sequence.

17. The interference cancellation system of claim 1 used for substantially linear 1553 systems.

* * * * *

UNITED STATES PATENT AND TRADEMARK OFFICE
CERTIFICATE OF CORRECTION

PATENT NO. : 7,907,690 B2
APPLICATION NO. : 11/550283
DATED : March 15, 2011
INVENTOR(S) : Taylor et al.

It is certified that error appears in the above-identified patent and that said Letters Patent is hereby corrected as shown below:

Claim 12, Col. 20, line 44 "wherein $\phi$ is" should be -- wherein $\psi$ is --.

Signed and Sealed this
Sixteenth Day of October, 2012

David J. Kappos
*Director of the United States Patent and Trademark Office*